(12) United States Patent
Tagawa

(10) Patent No.: US 11,218,614 B2
(45) Date of Patent: Jan. 4, 2022

(54) IMAGE READING APPARATUS AND CONTROL METHOD THEREOF

(71) Applicant: SEIKO EPSON CORPORATION, Tokyo (JP)

(72) Inventor: Nobu Tagawa, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/879,990

(22) Filed: May 21, 2020

(65) Prior Publication Data

US 2020/0374415 A1    Nov. 26, 2020

(30) Foreign Application Priority Data

May 24, 2019   (JP) .............................. JP2019-097493

(51) Int. Cl.
*H04N 1/00*   (2006.01)
*H04N 1/23*   (2006.01)

(52) U.S. Cl.
CPC ..... *H04N 1/00824* (2013.01); *H04N 1/00408* (2013.01); *H04N 1/00822* (2013.01)

(58) Field of Classification Search
None
See application file for complete search history.

(56) References Cited

U.S. PATENT DOCUMENTS

| 4,910,551 A * | 3/1990 | Onoda ................... G03G 15/00 355/21 |
| 6,744,537 B1 * | 6/2004 | Chiba .................. H04N 1/1077 358/473 |
| 2007/0188818 A1 * | 8/2007 | Westcott ............ H04N 1/00583 358/296 |
| 2011/0228350 A1 * | 9/2011 | Wakaura .................. G01C 9/06 358/474 |
| 2020/0076974 A1 * | 3/2020 | Koyanagi .......... H04N 1/00562 |

FOREIGN PATENT DOCUMENTS

| JP | 2009135672 | * | 6/2009 | ............... H04N 1/00 |
| JP | 2009-527143 | | 7/2009 | |

* cited by examiner

*Primary Examiner* — Beniyam Menberu
(74) *Attorney, Agent, or Firm* — Workman Nydegger

(57) ABSTRACT

An image reading apparatus includes a main body including a posture switching unit configured to switch the main body between a plurality of holding postures, a mode switching unit configured to switch between a plurality of modes corresponding to respective types of the document, display unit configured to display a first screen indicating a first combination of the holding posture and the mode, where the first combination is permitted, and a second screen indicating a second combination of the holding posture and the mode, where the second combination is prohibited, and a controller. The controller displays the first screen on the display unit when a state is switched to a state of the first combination, and displays the second screen on the display unit after a Predetermined time elapses since a state was switched to a state of the second combination.

8 Claims, 17 Drawing Sheets

FIG. 6
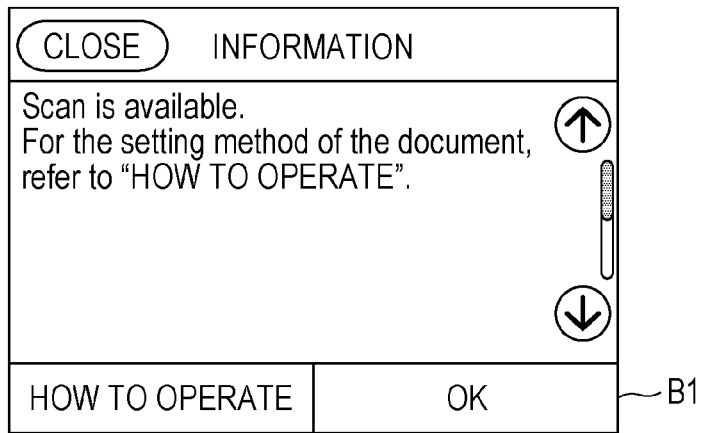
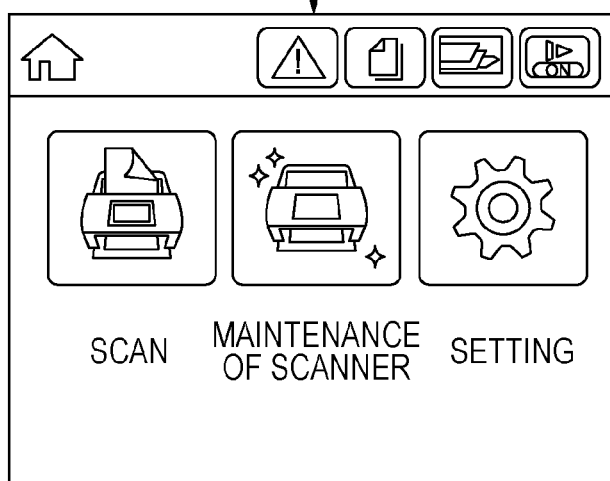
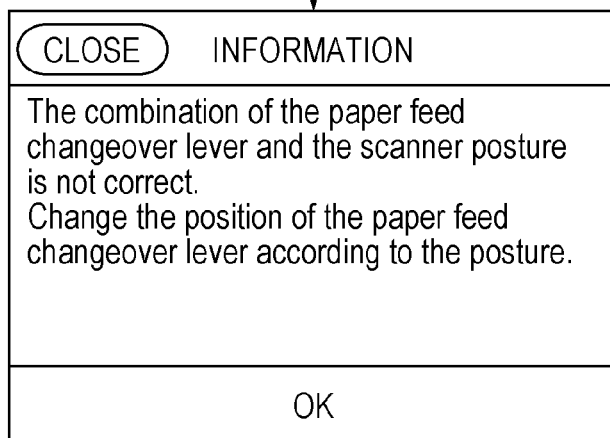

FIG. 9
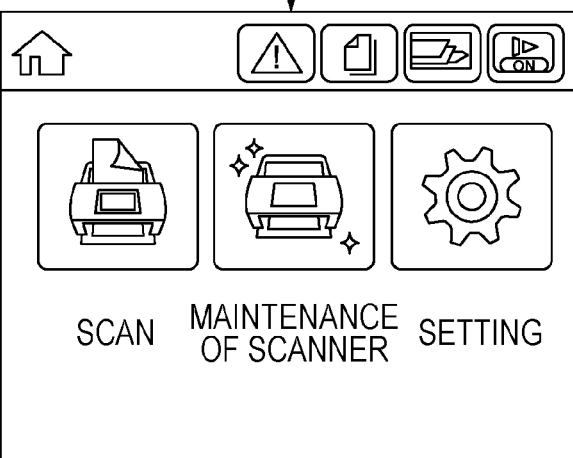
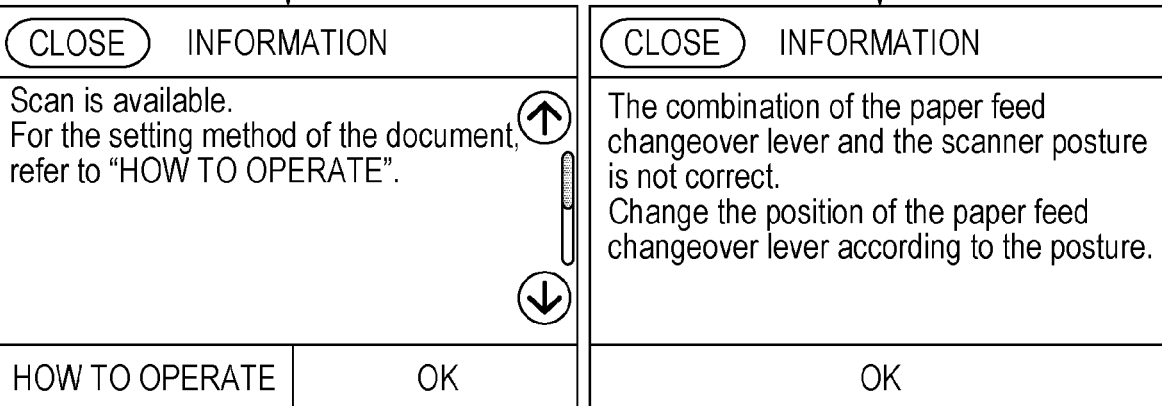

IMAGE READING APPARATUS AND CONTROL METHOD THEREOF

The present application is based on, and claims priority from JP Application Serial Number 2019-097493, filed May 24, 2019, the disclosure of which is hereby incorporated by reference herein in its entirety.

BACKGROUND

1. Technical Field

The present disclosure relates to an image reading apparatus configured to switch between a plurality of postures of a main body, and a control method thereof.

2. Related Art

As an image reading apparatus, JP-T-2009-527143 discloses a document imaging apparatus configured to adjust an inclination angle of an imaging apparatus main body including an image data conversion device and a paper feeding device to one of a plurality of inclination angle positions. The imaging apparatus main body is pivotally coupled to the support base.

When the paper feeding mode is set according to the type of the document, there is a paper feeding mode which it is desired not to combine with an inclination angle of the main body among the inclination angles from the viewpoint of the accuracy with which the document is fed. For example, when the inclination of the main body is a first inclination angle which is almost vertical, the angle is not suitable for feeding the thin paper. Therefore, it is desired not to combine the thin paper feeding mode with the first inclination angle. Also, even when the inclination of the main body is a second inclination angle which is small, there may be a paper feeding mode which it is desired not to combine with the second inclination angle. Therefore, it is conceivable to display a screen for guiding an undesired combination as an unsupported combination.

Here, it is assumed that a combination of the first inclination angle and the first paper feeding mode and a combination of the second inclination angle and the second paper feeding mode are supported, and a combination of the first inclination angle and the second paper feeding mode and a combination of the second inclination angle and the first paper feeding mode are not supported. When a combination is switched from the combination of the first inclination angle and the first paper feeding mode to the combination of the second inclination angle and the second paper feeding mode, the paper feeding mode is switched after the inclination angle of the main body is switched first, or the inclination angle of the main body is switched after the paper feeding mode is switched first. In either case, the temporarily unsupported combination is experienced. In this case, the display of the non-support guidance screen makes the user feel troublesome.

SUMMARY

According to an aspect of the present disclosure, an image reading apparatus includes a main body including a reading unit reading a document and a document supply unit supplying the document to the reading unit, a support unit supporting the main body, a posture switching unit configured to switch between a plurality of holding postures of the main body having different inclinations, a mode switching unit configured to switch between a plurality of modes corresponding to respective types of the document, display unit configured to display a first screen indicating a first combination of the holding posture and the mode, where the first combination is permitted, and a second screen indicating a second combination of the holding posture and the mode, where the second combination is prohibited, and a controller controlling a display through the display unit, wherein the controller displays the first screen on the display unit when a state is switched from a state that is not the first combination to a state of the first combination, and sets, as a second time, a time longer than a first time until when the first screen is displayed from a time of a changeover to the state of the first combination, and displays the second screen on the display unit after the second time elapses since a state was switched from a state that is not the second combination to a state of the second combination.

According to another aspect of the present disclosure, an image reading apparatus includes a main body including a reading unit reading a document and a document supply unit supplying the document to the reading unit, a support unit supporting the main body, a posture switching unit configured to switch between a plurality of holding postures of the main body having different inclinations, a mode switching unit configured to switch between a plurality of modes corresponding to respective types of the document, a display unit configured to display a first screen indicating a first combination of the holding posture and the mode, where the first combination is permitted, and a second screen indicating a second combination of the holding posture and the mode, where the second combination is prohibited, and a controller controlling a display through the display unit, wherein the controller does not display the second screen on the display unit even when a state is switched from a state that is not the second combination to a state of the second combination, and displays the second screen on the display unit when accepting an instruction to read the document in a state of the second combination.

According to yet another aspect of the present, in a method of controlling an image reading apparatus, where the image reading apparatus includes a main body including a reading unit reading a document and a document supply unit supplying the document to the reading unit, a support unit supporting the main body, a posture switching unit configured to switch between a plurality of holding postures of the main body having different inclinations, a mode switching unit configured to switch between a plurality of modes corresponding to respective types of the document, and a display unit displaying a screen, wherein the display unit is configured to display a first screen indicating a first combination of the holding posture and the mode, where the first combination is permitted, and a second screen indicating a second combination of the holding posture and the mode, where the second combination is prohibited, the controlling method includes a first step of displaying the first screen on the display unit when a state is switched from a state that is not the first combination to a state of the first combination, and a second step of setting, as a second time, a time longer than a first time until when the first screen is displayed from a time of a changeover to the state of the first combination, and displaying the second screen on the display unit after the second time elapses since a state was switched from a state that is not the second combination to a state of the second combination.

BRIEF DESCRIPTION OF THE DRAWINGS

FIG. 6 is a diagram schematically illustrating a change example of a screen.

FIG. 9 is a diagram schematically illustrating a change example of a screen.

DESCRIPTION OF EXEMPLARY EMBODIMENTS

Figure 1:
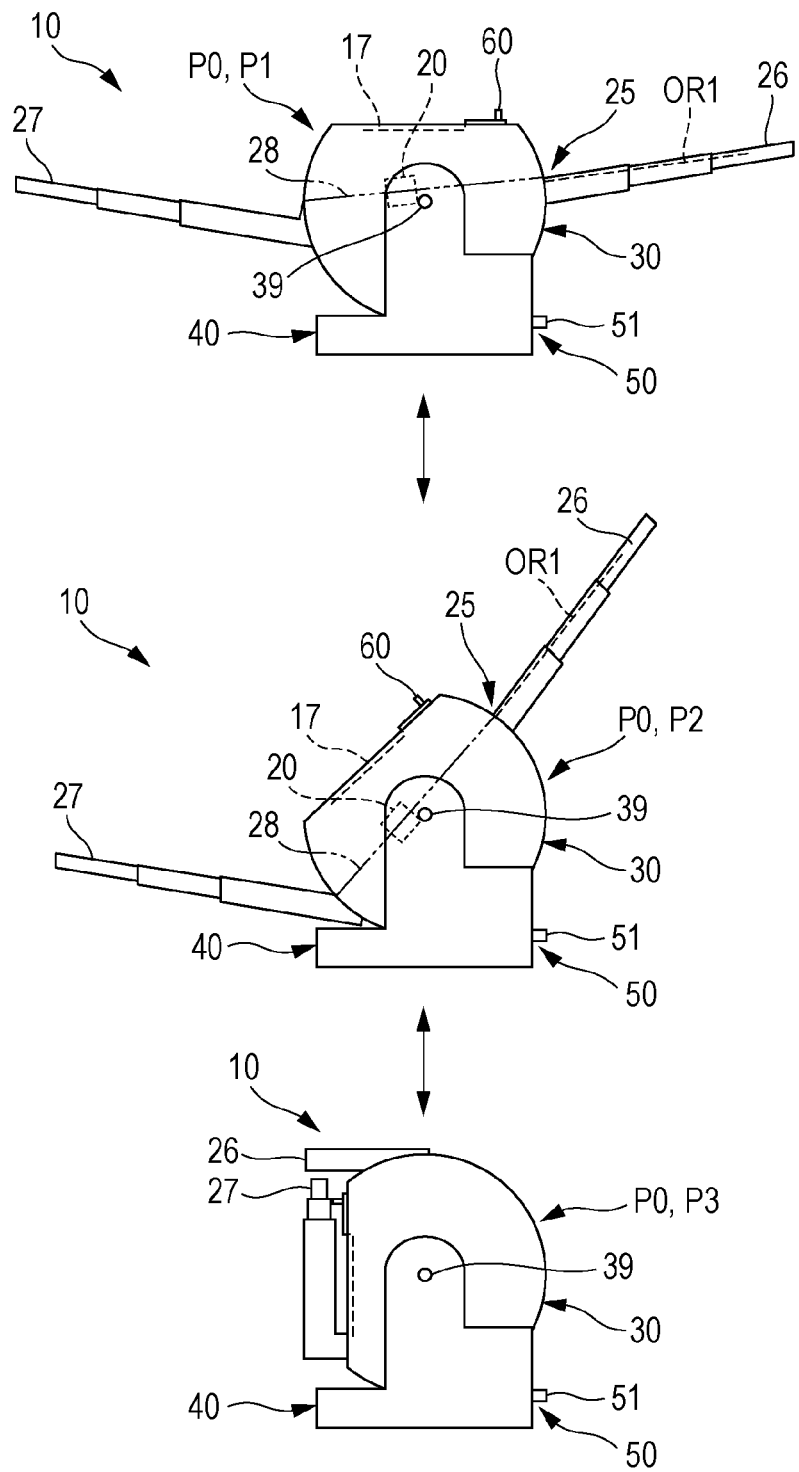
FIG. 1 is a diagram schematically illustrating an example of an image reading apparatus including a main body in each holding posture.

Hereinafter, embodiments of the present disclosure will be described. Of course, the following embodiments are merely examples of the present disclosure, and not all of the features described in the embodiments are essential for solving the disclosure.

1. Outline of Technology Included in the Present Disclosure

First, the outline of the technology included in the present disclosure will be described with reference to the examples illustrated in FIGS. 1 to 17. It should be noted that the drawings of the present application are schematic diagrams illustrating examples, and the enlargement ratios in the respective directions illustrated in these drawings may be different, and the respective drawings may not match. Of course, respective components of the present technology are not limited to a specific example indicated by a reference numeral. In the "Outline of technology included in the present disclosure", the contents in parentheses mean supplementary explanation of the immediately preceding word.

First Embodiment

Figure 3:
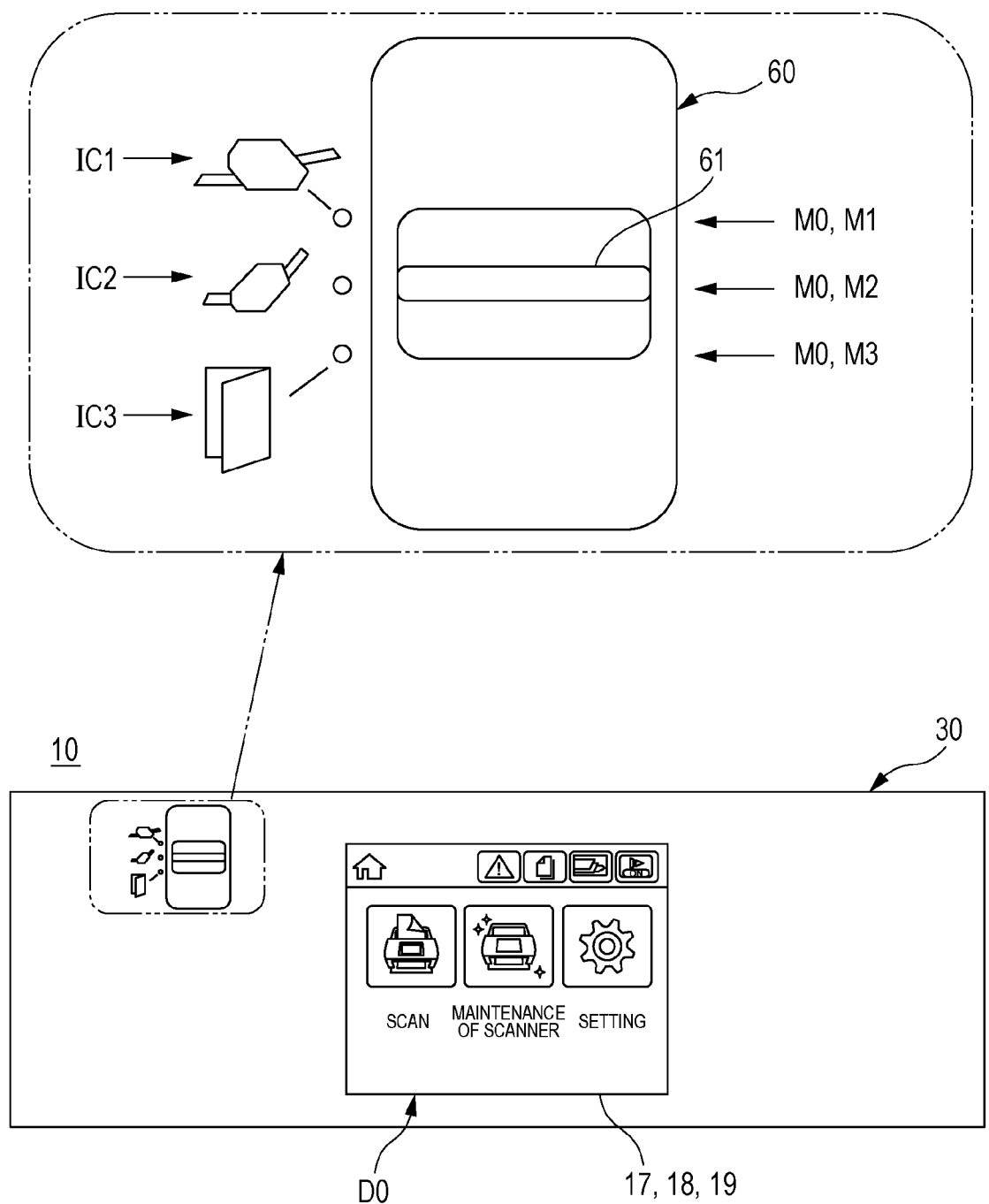
FIG. 3 is a diagram schematically illustrating an example of a front face of a main body.
Figure 4:
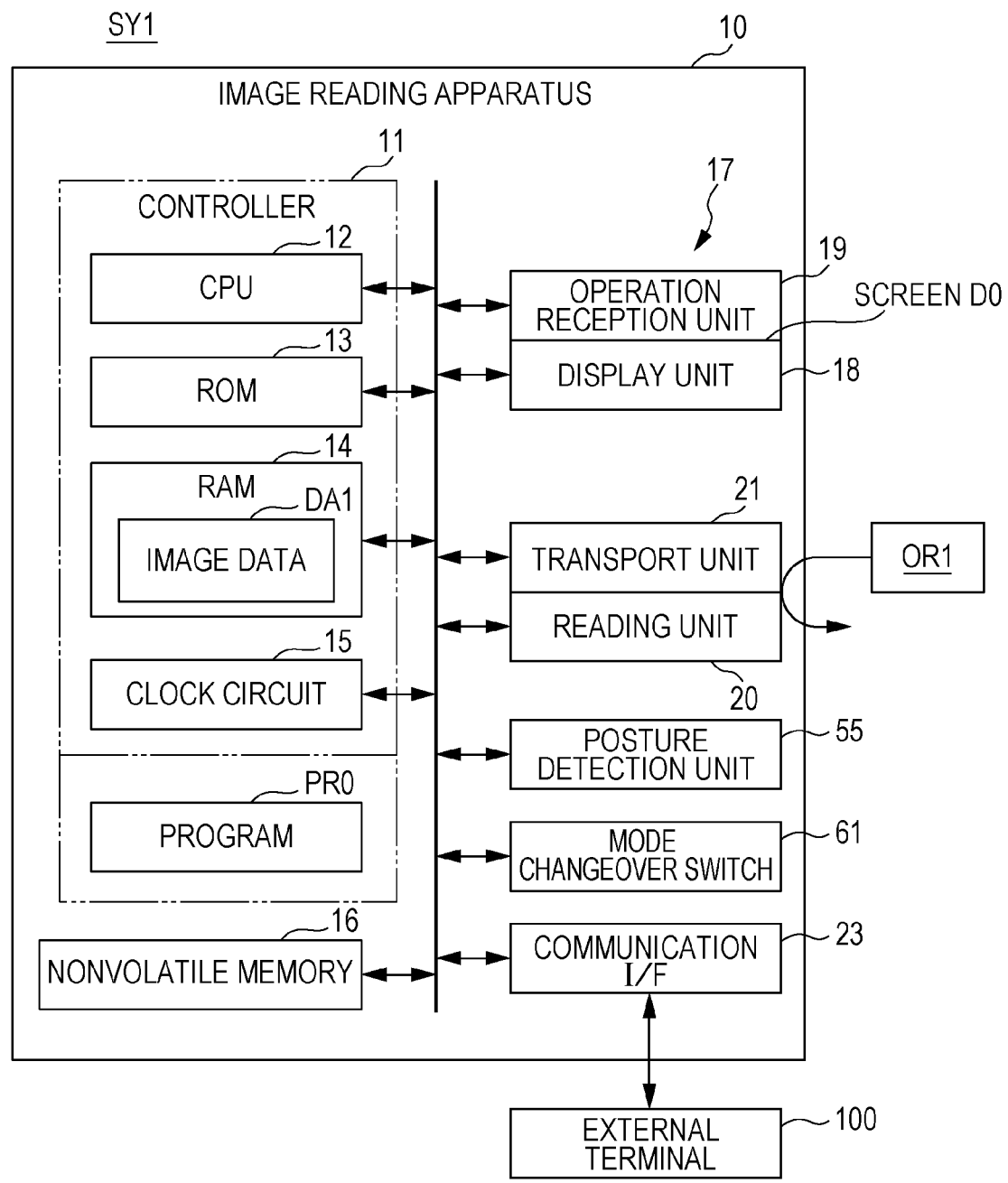
FIG. 4 is a block diagram schematically illustrating a configuration example of an image reading system.
Figure 7:
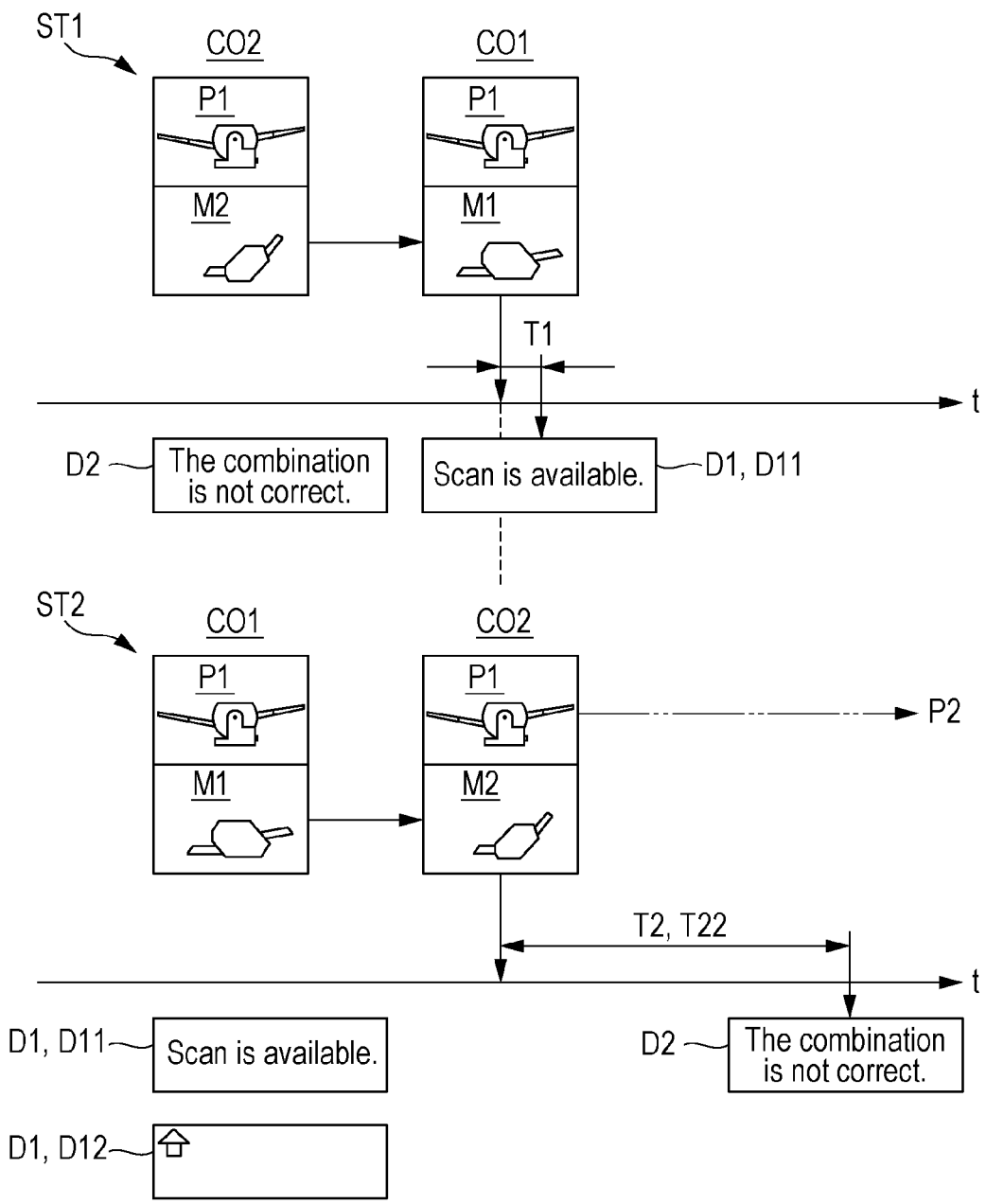
FIG. 7 is a diagram schematically illustrating an example of display timing of a first screen and a second screen.

As illustrated in FIGS. 1, 3, 4, and the like, an image reading apparatus 10 according to an embodiment of the present technology includes a main body 30 including a reading unit 20 that reads a document OR1 and a document supply unit 25 that supplies the document OR1 to the reading unit 20, a support unit 40 that supports the main body 30, and a posture switching unit 50 configured to switch the main body 30 to a plurality of holding postures P0 having different inclinations. The image reading apparatus 10 also includes a mode switching unit 60, a display unit 18, and a controller 11. The mode switching unit 60 is configured to switch between a plurality of modes M0 corresponding to the types of the document OR1. The display unit 18 is configured to display a first screen D1 indicating a first combination CO1 of the holding posture P0 and the mode M0 where the first combination CO1 is permitted and a second screen D2 indicating a second combination CO2 of the holding posture P0 and the mode M0 where the second combination CO2 is prohibited. The controller 11 displays, on the display unit 18, the first screen D1 when a state is switched from the state that is not the first combination CO1 to the state of the first combination CO1. Here, as illustrated in FIG. 7 and the like, a time longer than a first time T1 until when the first screen D1 is displayed from the time of a changeover to the state of the first combination CO1 is set as a second time T2. The controller 11 displays the second screen D2 on the display unit 18 after the second time T2 elapses since a state was switched from a state that is not the second combination CO2 to a state of the second combination CO2.

As a result, even when a combination of the posture of the main body 30 and the mode M0 is temporarily an unsupported combination, the screen is not immediately switched to the second screen D2 indicating the non-support. Therefore, the present embodiment can provide an image reading apparatus that does not make the user feel troublesome.

Here, examples of the image reading apparatus includes a scanner, a facsimile, a multifunction machine having a function of reading a document and a function of outputting image data. The state which is not the first combination is not limited to the state of the second combination, and includes a state where the posture of the main body is not any of the plurality of holding postures. The state which is not the second combination is not limited to the state of the first combination, and includes a state where the posture of the main body is not any of the plurality of holding postures. The first time until when the first screen is displayed from the time of a changeover to the state of the first combination is not limited to the time recognizable by human eyes, but may be a time of the order of milliseconds or less. In the present application, "first", "second", "third", . . . are terms for identifying each component, and do not mean an order. Note that the above remarks are also applied to the following embodiments.

Second Embodiment

Figure 10:
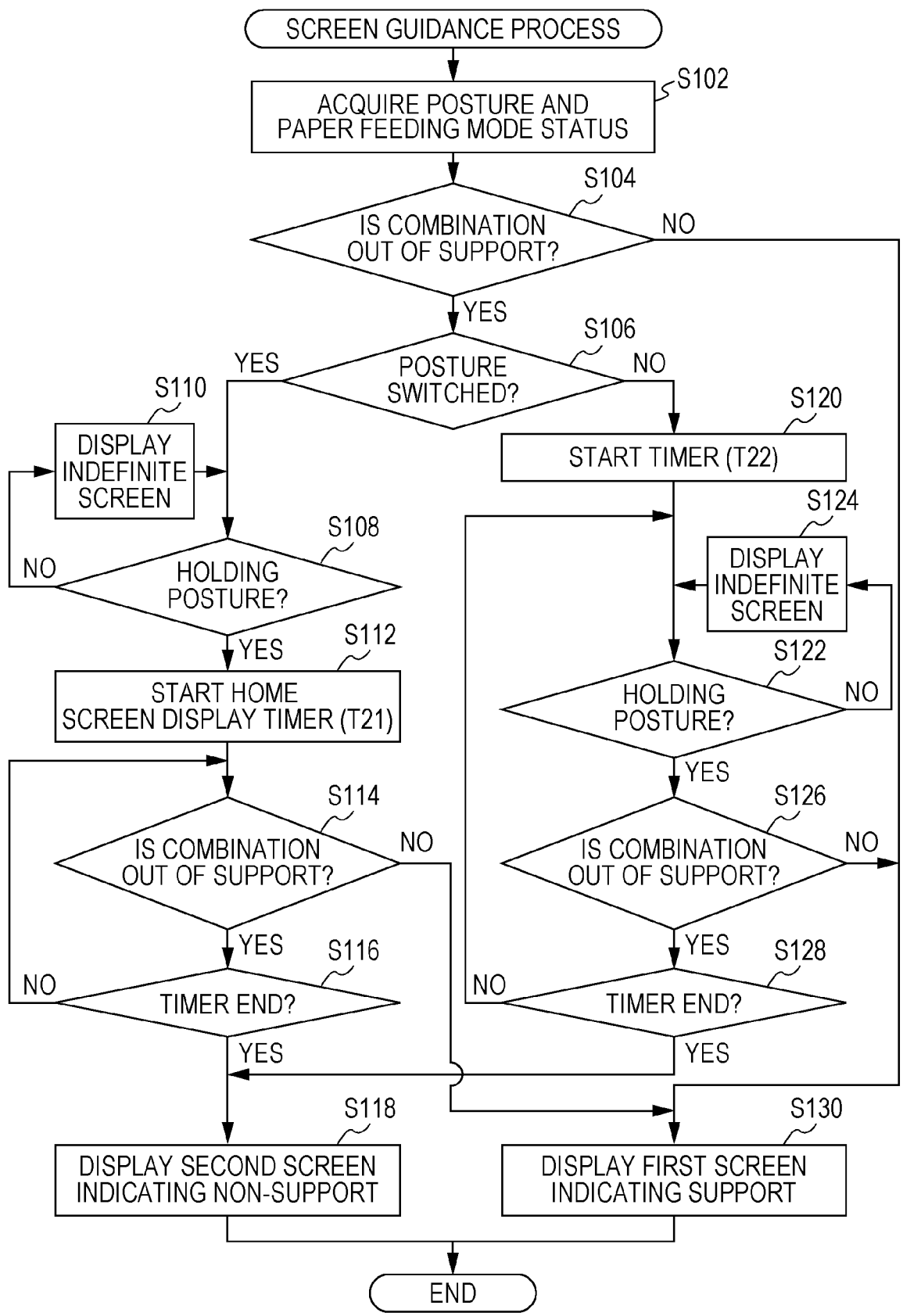
FIG. 10 is a flowchart illustrating an example of a screen guidance process performed by a controller.

As illustrated in FIG. 10 and the like, when a state changes from the state of the second combination CO2 to the state of the first combination CO1 before the second time T2 elapses, the controller 11 may display the first screen D1 on the display unit 18. In the embodiment, when a combination of the posture of the main body 30 and the mode M0 is a supported combination, the first screen D1 indicating the support is displayed, so that it is possible to more appropriately grasp the state of the image reading apparatus.

Third Embodiment

Figure 15:
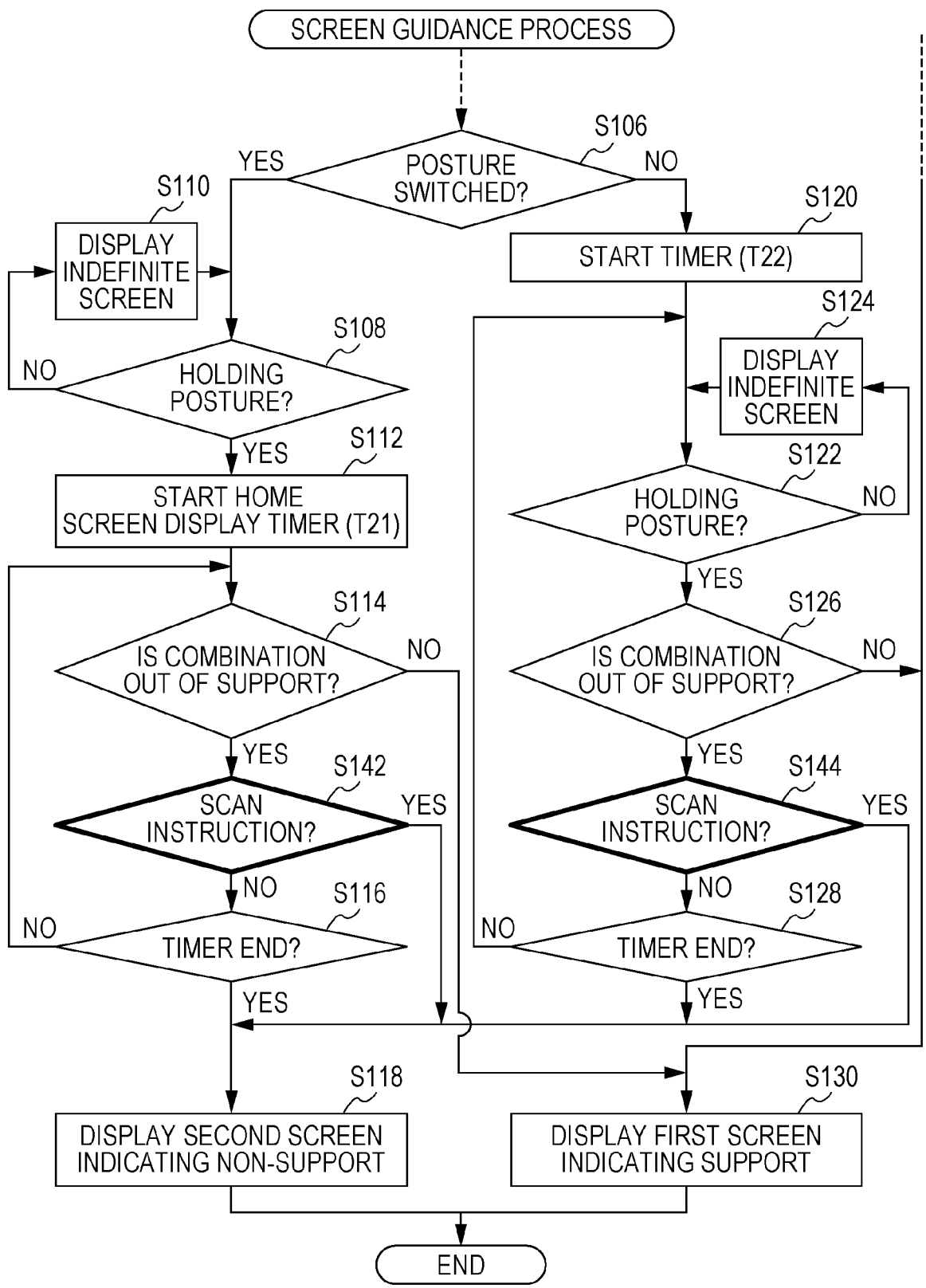
FIG. 15 is a flowchart illustrating another example of a screen guidance process performed by the controller.

As illustrated in FIG. 15, when accepting an instruction to read the document OR1 (for example, steps S142 and S144) before the second time T2 elapses in the state of the second combination CO2, the controller 11 may display the second screen D2 on the display unit 18. In the embodiment, the second screen D2 indicating the non-support for an instruction to read the document OR1 is displayed even before the second time T2 elapses after a combination of the posture of the main body 30 and the mode M0 is an unsupported combination, so that it is possible to more appropriately grasp the state of the image reading apparatus.

Fourth Embodiment

Figure 8:
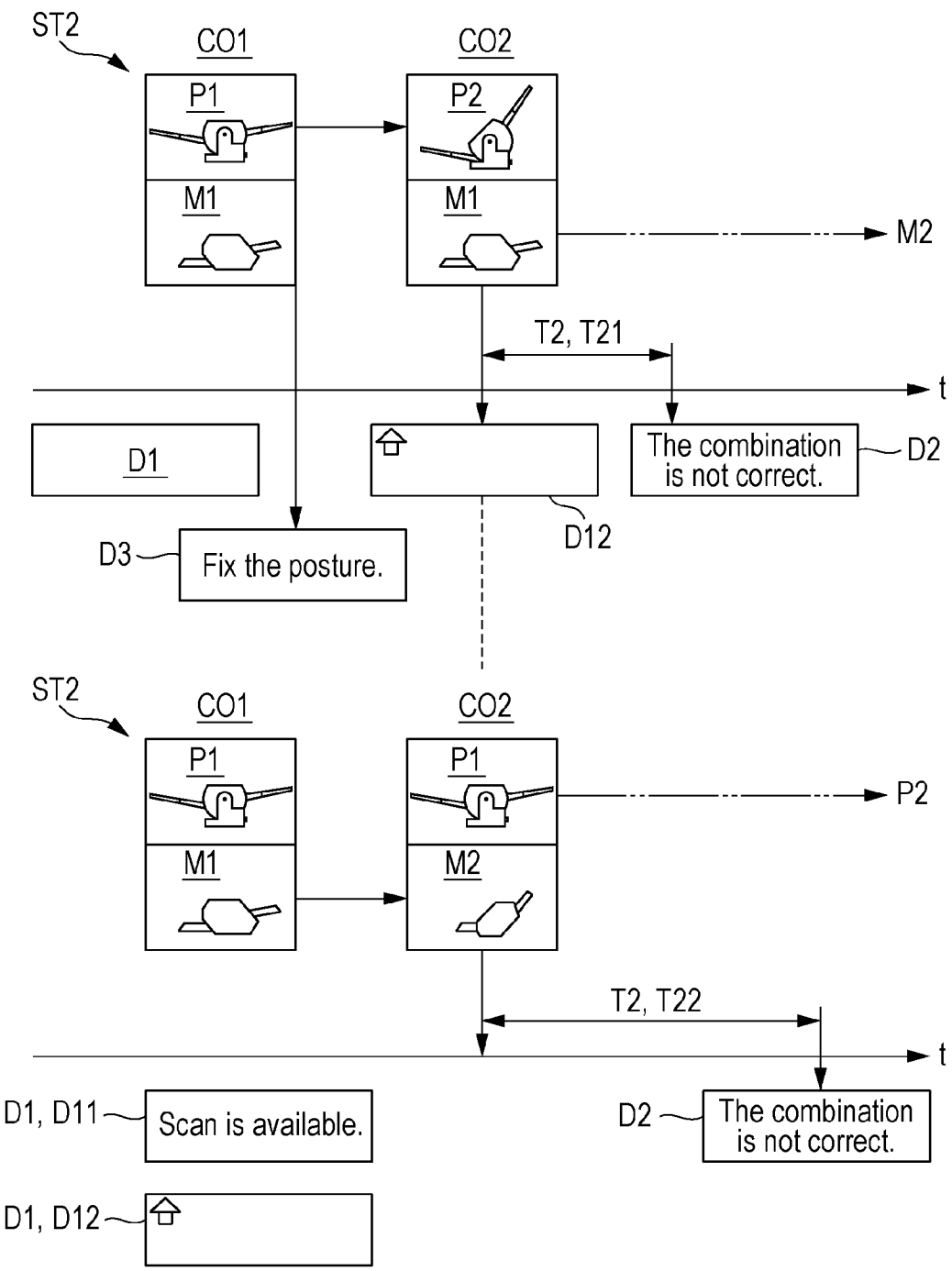
FIG. 8 is a diagram schematically illustrating an example of display timing of a second screen.

As illustrated in FIG. 8 and the like, the second time (for example, a second time T22 illustrated in the lower part of FIG. 8) when a state is switched to the first combination CO1 by the changeover of the holding posture P0 after switched to the second combination CO2 may be longer than the second time (for example, a second time T21 illustrated in the upper part of FIG. 8) when a state is switched to the first combination CO1 by the changeover of the mode M0 after switched to the second combination CO2. The operation of switching the holding posture P0 of the main body 30 takes longer time than the operation of switching the mode M0. In the above fourth embodiment, it is possible to prevent the user from feeling troublesome or the like in the event in which the second screen D2 indicating the non-support is displayed before the operation of switching the holding posture P0 of the main body 30 or the second screen D2 indicating the non-support is not displayed even when the mode M0 is not switched for a long time.

Fifth Embodiment

As illustrated in FIG. 9 and the like, the controller 11 may display, on the display unit 18, a third screen D3 indicating that the main body 30 is not held at any of the plurality of holding postures P0 when the main body 30 is not held in any of the plurality of holding postures P0. In the embodiment, since the third screen D3 indicating that the main body 30 is not held in any of the plurality of holding postures P0 is displayed, it is possible to more appropriately grasp the state of the image reading apparatus.

Sixth Embodiment

As illustrated in FIG. 4, the image reading apparatus 10 may further include a posture detection unit 55 that detects the posture of the main body 30. The controller 11 may display the first screen D1 on the display unit 18 when a combination of the posture detected by the posture detection unit 55 and the mode M0 indicated by the mode switching unit 60 is switched from the state that is not the first combination CO1 to the state of the first combination CO1. The controller 11 may display the second screen D2 on the display unit 18 after the second time T2 elapses since a combination of the posture detected by the posture detection unit 55 and the mode M0 indicated by the mode switching unit 60 was switched from a state that is not the second combination CO2 to a state of the second combination CO2. In the present embodiment, the holding posture included in the first combination CO1 and the holding posture included in the second combination CO2 are detected by the posture detection unit 55, so that it is possible to display the first screen D1 and the second screen D2 on the display unit 18 at the more appropriate timing. Therefore, according to the embodiment, it is possible to more appropriately grasp the state of the image reading apparatus.

Seventh Embodiment

Figure 16:
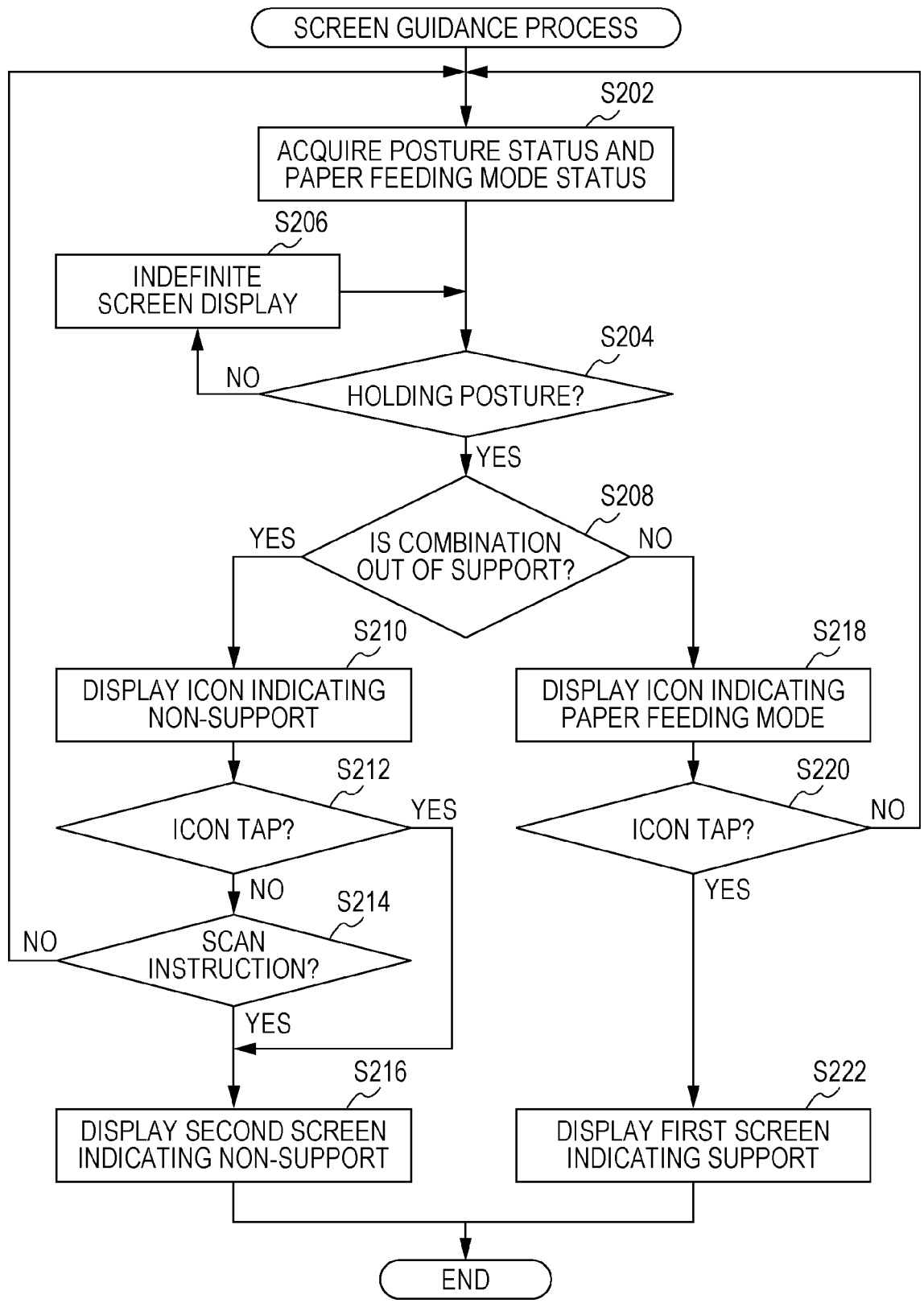
FIG. 16 is a flowchart illustrating another example of a screen guidance process performed by the controller.

As illustrated in FIG. 16, in the image reading apparatus 10 according to another embodiment of the present technology, the controller 11 does not display the second screen D2 on the display unit 18 even when a state is switched from a state that is not the second combination CO2 to a state of the second combination CO2, and displays the second screen D2 on the display unit 18 when accepting an instruction to read the document OR1 in the state of the second combination CO2. As a result, even when a combination of the posture of the main body 30 and the mode M0 is temporarily an unsupported combination, the screen is not switched to the second screen D2 indicating the non-support until when the instruction to read the document OR1 is made. Therefore, the present embodiment can provide an image reading apparatus that does not make the user feel troublesome.

Eighth Embodiment

Further, as illustrated in FIG. 7 and the like, the control method according to an embodiment of the present technology is a method of controlling the image reading apparatus 10, and includes a first step ST1 and a second step ST2. In the first step ST1, the first screen D1 is displayed on the display unit 18 when a state is switched from the state that is not the first combination CO1 to the state of the first combination CO1. Here, a time longer than the first time T1 until when the first screen D1 is displayed from the time of a changeover to the state of the first combination CO1 is set as the second time T2. In the second step ST2, the second screen D2 is displayed on the display unit 18 after the second time T2 elapses since a state was switched from a state that is not the second combination CO2 to a state of the second combination CO2.

As a result, even when a combination of the posture of the main body 30 and the mode M0 is temporarily an unsupported combination, the screen is not immediately switched to the second screen D2 indicating the non-support. Therefore, the embodiment can provide the control method of the image reading apparatus that does not make the user feel troublesome.

Further, the present technology is applicable to an image reading system including an image reading apparatus, a method of controlling the image reading system, a control program of the image reading apparatus, a control program of the image reading system, and a computer readable medium for recording any of the above-described control programs, and the like. The image reading apparatus or the image reading system may be composed of a plurality of distributed parts.

2. Specific Example of Image Reading Apparatus

Figure 2:
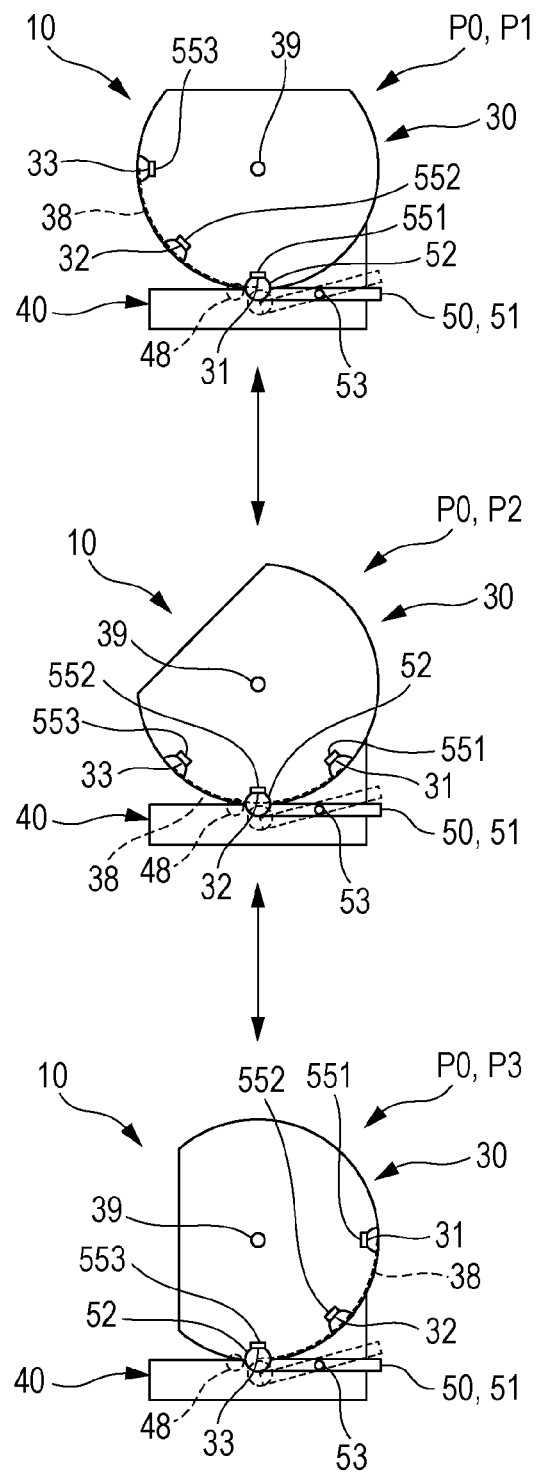
FIG. 2 is a diagram schematically illustrating an example of a holding mechanism of a main body.

FIG. 1 schematically illustrates the image reading apparatus 10 including the main body 30 that can take a plurality of holding postures P0 having different inclinations. FIG. 2 schematically illustrates a holding mechanism of the main body 30. FIG. 3 schematically illustrates the front of the main body 30. An enlarged view of the mode switching unit 60 is illustrated in the upper part of FIG. 3. FIG. 4 schematically illustrates the configuration of an image reading system SY1 including the image reading apparatus 10. The image reading system SY1 illustrated in FIG. 4 includes the image reading apparatus 10 and one or more external terminals 100.

The image reading apparatus 10 includes the main body 30, the support unit 40 of the main body 30, and the posture switching unit 50 of the main body 30. The main body 30 includes the reading unit 20 that reads the document OR1, and the document supply unit 25 that supplies the document OR1 to the reading unit 20. The support unit 40 supports the main body 30. The posture switching unit 50 is configured to switch the main body 30 to a plurality of holding postures P0 having different inclinations. The plurality of holding postures P0 illustrated in FIGS. 1 and 2 includes a substantially horizontal posture P1 in which a transport path 28 of the document OR1 is nearest to a horizontal state, a standard posture P2 in which the inclination of the path 28 is steeper than that of the substantially horizontal posture P1, and a storage posture P3 in which the path 28 is nearest to a vertical state. The substantially horizontal posture P1 is a position suitable for reading a document such as the thin paper which is fed with low accuracy for a paper feeding tray 26 when the tray has a steep inclination. The standard posture P2 is a posture suitable for reading a document such as the fixed-size paper that is smoothly fed for the paper feeding tray 26 when the tray has a steep inclination. The storage posture P3 is a posture in which the installation area of the image reading apparatus 10 is the smallest and suitable for storage. The substantially horizontal posture P1 is not limited to a completely horizontal posture, and may be an inclined posture as long as the posture is nearer to a horizontal state than the standard posture P2.

Further, the image reading apparatus 10 includes the mode switching unit 60, the display unit 18, and the controller 11. These components may be located in either the main body 30 or the support unit 40, and may be present across the main body 30 and the support unit 40. In the following description, it is assumed that these components 60, 18, and 11 are located in the main body 30. The mode switching unit 60 is configured to switch between the plurality of paper feeding modes M0 corresponding to the types of the document OR1. The plurality of paper feeding modes M0 illustrated in FIG. 3 includes a substantially horizontal paper feeding mode M1 for reading a document such as the thin paper, a standard paper feeding mode M2 for reading a commonly used document such as the fixed-size paper, and a manual paper feeding mode M3 for setting and reading documents such as a booklet or a passport one sheet by one sheet. In the substantially horizontal paper feeding mode M1, reading in the standard posture P2 is prohibited, and reading only in the substantially horizontal posture P1 is allowed. This is for the purpose of increasing the accuracy of reading a document which is fed with low accuracy for the paper feeding tray 26 in the standard posture P2. In the standard paper feeding mode M2, reading in the substantially horizontal posture P1 is prohibited, and reading only in the standard posture P2 is allowed. This is for the purpose of improving the accuracy of reading a commonly used document such as the fixed-size paper. In the manual paper feeding mode M3, reading is allowed in both the substantially horizontal posture P1 and the standard posture P2.

From the above, the permitted first combination CO1 of the holding posture P0 and the paper feeding mode M0 is as follows.
(Combination 1) A combination of the substantially horizontal posture P1 and the substantially horizontal paper feeding mode M1
(Combination 2) A combination of the standard posture P2 and the standard paper feeding mode M2
(Combination 3) A combination of the substantially horizontal posture P1 and the manual paper feeding mode M3
(Combination 4) A combination of the standard posture P2 and the manual paper feeding mode M3 Further, the prohibited second combination CO2 of the holding posture P0 and the paper feeding mode M0 is as follows.
(Combination 5) A combination of the substantially horizontal posture P1 and the standard paper feeding mode M2
(Combination 6) A combination of the standard posture P2 and the substantially horizontal paper feeding mode M1

First, respective components included in the image reading apparatus 10 will be described. As illustrated in FIG. 2, the main body 30 including the reading unit 20 and the document supply unit 25 includes lock holes 31, 32, and 33, a rack 38, and position sensors 551, 552, and 553, and is inclinably supported about a rotation axis 39 with respect to the support unit 40. The position sensors 551, 552, and 553 are an example of the posture detection unit 55 illustrated in FIG. 4. When a lock arm 52 of the posture switching unit 50 enters any one of the lock holes 31, 32, and 33, the main body 30 is held in one of a plurality of holding postures. When the lock arm 52 enters the first lock hole 31, the main body 30 is held in the substantially horizontal posture P1. When the lock arm 52 enters the second lock hole 32, the main body 30 is held in the standard posture P2. When the lock arm 52 enters the third lock hole 33, the main body 30 is held in the storage posture P3. The rack 38 is engaged with a pinion 48 of the support unit 40. The rack mechanism including the rack 38 and the pinion 48 has a function of smoothly inclining the main body 30 about the rotation axis 39. The position sensors 551, 552, and 553 are disposed in the lock holes 31, 32, and 33, respectively. The first position sensor 551 present in the first lock hole 31 detects whether the main body 30 is locked in the substantially horizontal posture P1. The second position sensor 552 present in the second lock hole 32 detects whether the main body 30 is locked in the standard posture P2. The third position sensor 553 present in the third lock hole 33 detects whether the main body 30 is locked in the storage posture P3. Examples of the position sensors 551, 552, and 553 may include non-contact sensors such as an optical sensor and a magnetic sensor, and contact sensors such as a limit switch.

The document supply unit 25 includes a transport unit 21 illustrated in FIG. 4, the paper feeding tray 26 that stacks the documents OR1 supplied to the transport path 28, and a paper discharge tray 27 on which the documents OR1 discharged from the transport path 28 are placed. The paper feeding tray 26 is extendable and contractable, and can be inclined toward the front, of the main body 30, on which an operation panel 17 is located. The paper discharge tray 27 is extendable and contractable, and can be inclined toward the front, of the main body 30, on which the operation panel 17 is located. When both the trays 26 and 27 are shortened and moved with inclination toward the front of the main body 30 in a case where the main body 30 is in the storage posture P3, the image reading apparatus 10 has a compact shape suitable for storage.

The support unit 40 includes the pinion 48 that engages with the rack 38, and inclinably supports the main body 30 about a rotation axis 39. A posture changeover lever 51 that is inclinable about a lever rotation axis 53 is attached to the support unit 40. One end of the posture changeover lever 51 protrudes from the support unit 40, and the above-described lock arm 52 is fixed to the other end of the posture changeover lever 51. A force is applied to the posture changeover lever 51 in a direction to push the lock arm 52 toward the main body 30 by an elastic mechanism (not illustrated). The lock arm 52 enters the first lock hole 31 when the main body 30 is in the substantially horizontal posture P1, and enters the second lock hole 32 when the main body 30 is in the standard posture P2, and enters the third lock hole 33 when the main body 30 is in the storage posture P3. When the user raises the one end of the posture changeover lever 51 with a finger, the lock arm 52 is disengaged from the lock holes 31, 32, and 33, and the main body 30 can be inclined.

As illustrated in FIG. 3, the operation panel 17 and the mode switching unit 60 are disposed on the front of the main body 30. The operation panel 17 illustrated in FIG. 3 includes the display unit 18 that displays a screen D0, and an operation reception unit 19 as a touch panel attached to a surface of the display unit 18. The mode switching unit 60 has a mode changeover switch 61 for selecting any one of the plurality of paper feeding modes M0. As illustrated in the enlarged view of FIG. 3, a substantially horizontal paper feeding icon IC1 is associated with the substantially horizontal paper feeding mode M1, a standard paper feeding icon IC2 is associated with the standard paper feeding mode M2, and a manual paper feeding icon IC3 is associated with the manual paper feeding mode M3.

The image reading apparatus 10 illustrated in FIG. 4 include, as the electric system, a CPU 12, which is a processor, a ROM 13, which is a semiconductor memory, a RAM 14, which is a semiconductor memory, a clock circuit 15, a nonvolatile memory 16, the operation panel 17, the reading unit 20, the transport unit 21, a communication interface 23, the posture detection unit 55, and the mode changeover switch 61. Here, the CPU is an abbreviation for a central processing unit, the ROM is an abbreviation for a read only memory, the RAM is an abbreviation for a random access memory, and the I/F illustrated in FIG. 4 is an abbreviation for an interface. The control program PRO that causes the computer to function as the image reading apparatus 10 is stored in at least one of the ROM 13 and the nonvolatile memory 16 and executed by the CPU 12. The CPU 12 executes the program PRO while using the RAM 14 as a work area to perform various processes such as a control process of the operation panel 17, a control process of the reading unit 20, a control process of the transport unit 21, and an output process of image data DA1 which is read data of the document OR1. The above-described components 12 to 15 are an example of the controller 11. The processor constituting the controller 11 is not limited to one CPU, but may be a plurality of CPUs, a hardware circuit such as an ASIC, a combination of the CPU and the hardware circuit, or the like. Here, the ASIC is an abbreviation for an application specific integrated circuit. The RAM 14 includes a buffer for temporarily storing the image data DA1.

Examples of the nonvolatile memory 16 may include a semiconductor memory such as a flash memory, a magnetic recording medium such as a hard disk. When the program PRO is stored, the nonvolatile memory 16 becomes a computer-readable medium on which the program PRO is recorded.

The operation panel 17 includes the display unit 18 that displays the screen D0, and the operation reception unit 19 that accepts an operation on the screen D0. The screen D0 includes screens D1, D2, and D3 illustrated in FIGS. 6 and 9. The first screen D1 illustrates the permitted first combination CO1 of the holding posture P0 and the paper feeding mode M0. The second screen D2 illustrates the prohibited second combination CO2 of the holding posture P0 and the paper feeding mode M0. The third screen D3 indicates that the main body 30 is not held in any of the plurality of holding postures P0. An example of the display unit 18 may include a display panel such as a liquid crystal panel. Examples of the operation reception unit 19 may include the above-mentioned touch panel, hard keys including a keyboard.

The transport unit 21 includes a plurality of pairs of rollers installed in the transport path 28 passing through the reading unit 20, a servomotor that rotationally drives part of the plurality of rollers, and the like, and transports the document OR1 set in the paper feeding tray 26 to the paper discharge tray 27 along the transport path 28. The transport unit 21 that continuously transports the plurality of documents OR1 to the reading unit 20 is referred to as an ADF or an automatic paper feeding device. Here, the ADF is an abbreviation for an auto document feeder. While the document OR1 is typically paper, it may be a sheet medium such as a synthetic resin sheet. Objects appearing in the document OR1 include characters, photographs, paintings, and the like. However, the document OR1 may include a blank sheet.

The reading unit 20 includes a light source that irradiates the document OR1 in the transport path 28 with light, an image sensor that performs photoelectric conversion, a light receiving optical system that guides reflected light from the document OR1 to the image sensor, and, an analog-to-digital conversion unit that converts an analog electric signal output from the image sensor into a digital pixel value group, an image data storage processing unit that stores the image data DA1 based on the pixel value group in the RAM 14 as a buffer, and the like. After the light reflected from the object appearing on the document OR1 passes through the light receiving optical system and is converted into an electric signal by the image sensor, the image data DA1 based on the pixel value group output from the image sensor is stored in the RAM 14. Accordingly, the image data DA1 is obtained by reading the document OR1 transported by the transport unit 21, and the image data DA1 is stored in the buffer. As described above, the reading unit 20 generates the image data DA1 by reading the document OR1.

The communication interface 23 transmits and receives data to and from the external terminal 100 coupled by wire or wireless in accordance with a predetermined communication protocol. The connection between the communication interface 23 and the external terminal 100 may be a network connection such as a LAN or the Internet, or a local connection such as a USB connection. Here, the LAN is an abbreviation for a local area network, and the USB is an abbreviation for a Universal Serial Bus.

The external terminal 100 that can be used for the image reading system SY1 is not particularly limited to a computer such as a personal computer or a tablet terminal, a mobile phone such as a smartphone, or the like. The image reading apparatus 10 can transmit the image data DA1 stored in the RAM 14 to the external terminal 100.

Note that the image reading apparatus 10 is not limited to a scanner-dedicated machine, but may be a multifunction machine also having at least some of a print function, a facsimile communication function, an e-mail transmission function, and the like. The image reading apparatus 10 may include all components in one housing, or may include a plurality of devices communicably divided.

Figure 5A:
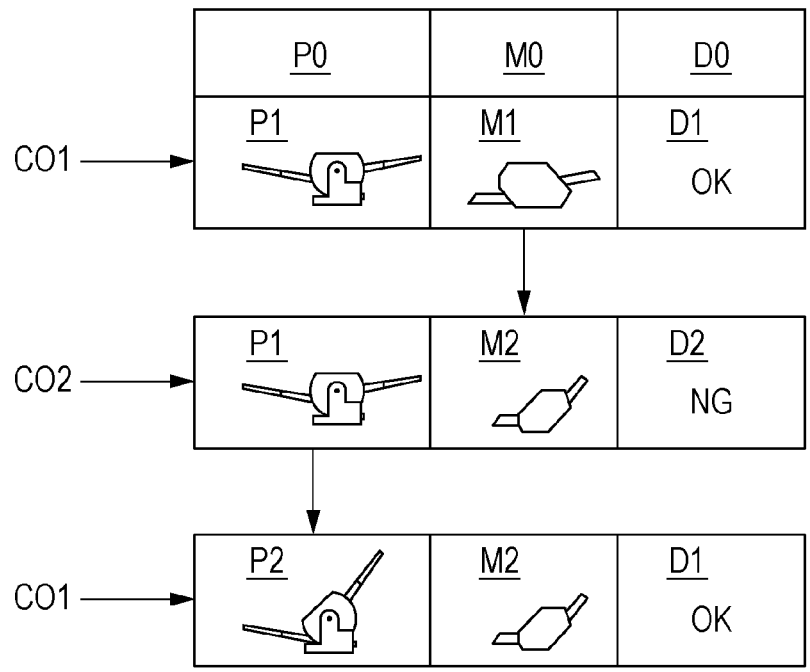
FIGS. 5A and 5B are diagrams schematically illustrating an example in which a permitted first combination is switched to another first combination via a prohibited second combination.
Figure 5B:
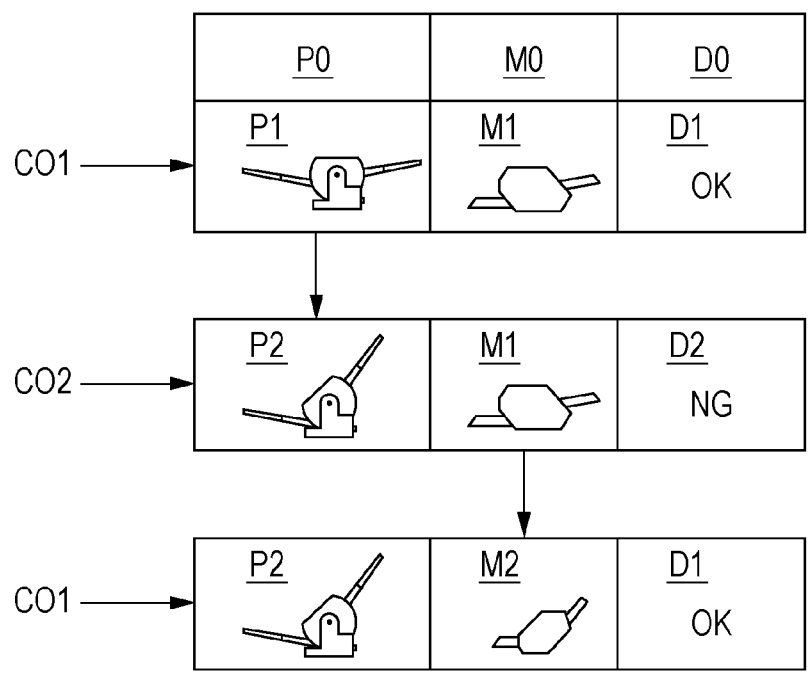

As illustrated in FIGS. 5A and 5B, it is assumed that a combination is switched from the permitted first combination CO1 of the substantially horizontal posture P1 and the substantially horizontal paper feeding mode M1 is to the permitted first combination CO1 of the standard posture P2 and the standard paper feeding mode M2. First, when the state is switched from the state that is not the first combination CO1 to the state of the first combination CO1, a support guidance screen D11 illustrated in the upper part of FIG. 6 is displayed on the display unit 18. When the operation reception unit 19 accepts a touch operation on an OK button B1, the controller 11 display a home screen D12 illustrated in FIG. 6 on the display unit 18. The first screen D1 is a general term for the support guidance screen D11 and the home screen D12.

FIG. 5A illustrates an example in which the paper feeding mode M0 is switched by operating the mode changeover switch 61 first, and then the holding posture P0 of the main body 30 is switched by operating the posture changeover lever 51 or the like. In this case, the state becomes temporarily the prohibited second combination CO2 of the substantially horizontal posture P1 and the standard paper feeding mode M2. The lower part of FIG. 6 illustrates the second screen D2 as a non-support guidance screen illustrating the state of the second combination CO2. FIG. 5B illustrates an example in which the holding posture P0 of the main body 30 is switched by operating the posture changeover lever 51 or the like first, and then the paper feeding mode M0 is switched by operating the mode changeover switch 61. In this case, the state temporarily becomes the prohibited second combination CO2 of the standard posture P2 and the substantially horizontal paper feeding mode M1. Further, when a combination is switched from the first combination CO1 of the standard posture P2 and the standard paper feeding mode M2 to the first combination CO1 of the substantially horizontal posture P1 and the substantially horizontal paper feeding mode M1, the state temporarily becomes the second combination CO2.

Although the prohibited second combination CO2 is temporary, when the second screen D2 indicating the non-support is displayed, a user who views the screen feels troublesome. Even when the combination of the posture of the main body 30 and the paper feeding mode M0 is in a non-support state, in a case where the non-support state is kept for a very short time, it is highly likely that the non-support state is in a transition period for the setting by the user. Therefore, in this specific example, while the support guidance screen D11 is displayed immediately at the time of switching to the permitted first combination CO1, the second screen D2 indicating the non-support is displayed after a lapse of the second time T2 illustrated in FIG. 7 at the time of switching to the prohibited second combination CO2.

FIG. 7 schematically illustrates the display timing of the first screen D1 and the second screen D2. The horizontal axis illustrated in FIG. 7 indicates time t. The upper part of FIG. 7 illustrates an example in which the state of the second combination CO2 is switched to the state of the first combination CO1 by operating the mode changeover switch 61 when the standard paper feeding mode M2 is switched to the substantially horizontal paper feeding mode M1. The second screen D2 indicating the non-support is displayed in the state of the second combination CO2. The time of performing the operation of the mode changeover switch 61 is the time when the state is switched from the state that is not the first combination CO1 to the state of the first combination CO1. In the example illustrated in the upper part of FIG. 7, the support guidance screen D11 is displayed after a lapse of the first time T1, which is a slight processing time after the mode changeover switch 61 is switched. The first time T1 may be, for example, a time shorter than one second and a time of the order of milliseconds or less.

The lower part of FIG. 7 illustrates an example in which the state of the first combination CO1 is switched to the state of the second combination CO2 by operating the mode changeover switch 61 when the substantially horizontal paper feeding mode M1 is switched to the standard paper feeding mode M2. The state of the second combination CO2 in this case is a temporal state when the main body 30 is to be switched from the substantially horizontal posture P1 to the standard posture P2. The support guidance screen D11 or the home screen D12 is displayed in the state of the first combination CO1. The time of performing the operation of the mode changeover switch 61 is the time when the state is switched from the state that is not the second combination CO2 to the state of the second combination CO2. In the example illustrated at the bottom of FIG. 7, when the state of the second combination CO2 remains after the elapse of the second time T2 longer than the first time T1 from the changeover of the mode changeover switch 61, the second screen D2 indicating the non-support is displayed. The second time T2, which is substantially a time for which the display of the second screen D2 is delayed, is set in consideration of a screen changeover time, a time required to change the posture of the main body 30, a time required to operate the mode changeover switch 61, and the like. Therefore, the second time T2 is usually one second or more, and, for example, may be 5 seconds or more.

Further, the second time T2 when the paper feeding mode M0 is switched after the holding posture P0 is switched as illustrated in the upper part of FIG. 8 may be different from the second time T2 when the holding posture P0 is switched after the paper feeding mode M0 is switched as illustrated in the lower part of FIG. 8. The example illustrated in the lower part of FIG. 8 is the same as the example illustrated in the lower part of FIG. 7. The horizontal axis illustrated in FIG. 8 indicates time t. When the user pulls up one end of the posture changeover lever 51 from the state of the first combination CO1 illustrated in the upper part of FIG. 8, the first position sensor 551 detects the retreat of the lock arm 52, and the controller 11 displays, on the display unit 18, the third screen D3 indicating that the main body 30 is not held in any of the plurality of holding postures P0 as illustrated in the upper part of FIG. 9. The main body 30 is released from the substantially horizontal posture P1 by retracting the lock arm 52. When the main body 30 is in the standard posture P2 and the lock arm 52 enters the second lock hole 32, the second position sensor 552 detects the lock arm 52. This time is the time when the state is switched from the state that is not the second combination CO2 to the state of the second combination CO2, and the home screen D12 illustrated in FIG. 9 is displayed. The state of the second combination CO2 in this case is a temporal state when the paper feeding mode M0 is to be switched from the substantially horizontal paper feeding mode M1 to the standard paper feeding mode M2. In the example illustrated at the top of FIG. 8, when the state of the second combination CO2 remains after the elapse of the second time T21 longer than the first time T1 from the time when the main body 30 is locked to the standard posture P2, the second screen D2 indicating the non-support is displayed. On the other hand, when the state is switched to the first combination CO1 by operating the mode changeover switch 61 before the lapse of the second time T21, the support guidance screen D11 illustrated in the lower part of FIG. 9 is displayed.

In the example illustrated in the lower part of FIG. 8, when the state of the second combination CO2 remains after the lapse of the second time T22 longer than the first time T1 from the time when the state switched to the state of the second combination CO2 due to the change in the paper feeding mode M0, the second screen D2 indicating the non-support is displayed as illustrated in the lower part of FIG. 9. Note that the second times T21 and T22 are included in the second time T2 of the present technology. Here, the second time T21 illustrated in the upper part of FIG. 8 is the second time T2 when the state is switched to the state of the first combination CO1 by the changeover of the paper feeding mode M0 after switched to the state of the second combination CO2. The second time T22 illustrated in the lower part of FIG. 8 is the second time T2 when the state is switched to the state of the first combination CO1 by the changeover of the holding posture P0 after switched to the state of the second combination CO2, and is longer than the second time T21.

The operation of switching the holding posture P0 of the main body 30 takes longer time than the operation of switching the paper feeding mode M0. Since the second time T22 when switching the holding posture P0 is relatively long, it is possible to avoid the display that makes the user feel troublesome in the event in which the screen is switched to the second screen D2 indicating the non-support before the operation of switching the holding posture P0. In addition, since the second time T22 is longer than the second time T21 when switching the paper feeding mode M0, it is possible to avoid the inconvenience in the event in which the second screen D2 indicating the non-support is not displayed even when the time for which the paper feeding mode M0 is not switched is long.

3. Specific Example of Processing Performed by the Image Reading Apparatus

FIG. 10 schematically illustrates a screen guidance process performed by the controller 11. This process is started when the fact that the posture of the main body 30 has been switched or the paper feeding mode M0 has been switched is detected. Here, as illustrated in FIG. 7, a first step ST1 of displaying the first screen D1 on the display unit 18 when the state is switched from the state that is not the first combination CO1 to the state of the first combination CO1 corresponds to steps S102 to S104 and S130. A second step ST2 of displaying the second screen D2 on the display unit 18 after the lapse of the second time T2 since the state was switched from the state that is not the second combination CO2 to the state of the second combination CO2 corresponds to steps S102 to S128. Hereinafter, the description of "step" is omitted. The controller 11 performs a plurality of processes in parallel by a multitask.

When the screen guidance process starts, the controller 11 acquires the posture of the main body 30 from the posture detection unit 55 and acquires the state of the paper feeding mode M0 from the mode changeover switch 61 in S102. For example, when the first position sensor 551 detects that the main body 30 is locked in the substantially horizontal posture P1, the controller 11 acquires, from the posture detection unit 55, information that the main body 30 is held in the substantially horizontal posture P1. When the second position sensor 552 detects that the main body 30 is locked in the standard posture P2, the controller 11 acquires, from the posture detection unit 55, information that the main body 30 is held in the standard posture P2. When the position sensors 551, 552, and 553 detect that the main body 30 is not locked in any of the plurality of holding postures P0, the controller 11 acquires, from the posture detection unit 55, information that the main body 30 is not held in any of the plurality of holding postures P0. When the mode changeover switch 61 is at the position of the substantially horizontal paper feeding mode M1, the controller 11 acquires, from the mode changeover switch 61, information that the paper feeding mode M0 is the substantially horizontal paper feeding mode M1. When the mode changeover switch 61 is at the position of the standard paper feeding mode M2, the controller 11 acquires, from the mode changeover switch 61, information that the paper feeding mode M0 is the standard paper feeding mode M2.

Next, in S104, the controller 11 branches the process according to whether the combination of the posture of the main body 30 and the paper feeding mode M0 is out of support. The combination being out of support includes a case where the combination being the prohibited second combination CO2 and the posture of the main body 30 being not held in any of the plurality of holding postures P0. When the combination is not out of support, the combination is the permitted first combination CO1. In this case, the controller 11 advances the process to S130, and displays, on the display unit 18, the support guidance screen D11 illustrated in the upper part of FIG. 6, that is, the first screen D1 indicating the support. When the state is switched from the state that is not the first combination CO1 to the state of the first combination CO1, the support guidance screen D11 is displayed after the elapse of the first time T1, which is a very short processing time. After that, the controller 11 ends the screen guidance process.

When the combination is out of support in the determination process of S104, in S106, the controller 11 branches the process according to whether the start of the screen guidance process was triggered by a change in the posture of the main body 30. The controller 11 advances the process to S108 when the start of the screen guidance process was triggered by a change in the posture of the main body 30, and advances the process to S120 when the start of the screen guidance process was triggered by a change in the paper feeding mode M0.

In S108, the controller 11 branches the process according to whether the main body 30 is held in any of the plurality of holding postures P0. When the main body 30 is not held in any of the plurality of holding postures P0, the controller 11 displays, on the display unit 18, an indefinite screen, for example, the third screen D3 illustrated in the upper part of FIG. 9, in S110, and returns the process to S108. Therefore, when the main body 30 is not held in any of the plurality of holding postures P0, the processes of S108 to S110 is repeated until the main body 30 is held in any of the plurality of holding postures P0. When the main body 30 is held in any of the plurality of holding postures P0, the controller 11 advances the process to S112, displays, on the display unit 18, the home screen D12 illustrated in FIG. 9, and starts the timer for the second time T21 when switching the paper feeding mode M0 by using the clock circuit 15. The second time T21 is longer than the first time T1.

After the start of the timer, in S114, the controller 11 branches the process according to whether the combination of the holding posture P0 and the paper feeding mode M0 is out of support. When the combination is not out of support, that is, when the combination is the permitted first combination CO1, the controller 11 advances the process to S130 without waiting for the end of the timer, and displays, on the display unit 18, the support guidance screen D11 illustrated in the lower part of FIG. 9. Therefore, when the state of the second combination CO2 is switched to the state of the first combination CO1 before the elapse of the second time T2, the first screen D1 indicating the support is displayed. After that, the controller 11 ends the screen guidance process.

When the combination is out of support, that is, the prohibited second combination CO2, in the determination process of S114 the controller 11 advances the process to S116, and branches the process according to whether the timer has expired. When the timer has not expired, the controller 11 returns the process to S114. Accordingly, when the combination is switched to the allowable first combination CO1, the first screen D1 indicating the support is displayed in S130, and the screen guidance process ends.

When the timer has expired, the controller 11 advances the process to S118, and displays, on the display unit 18, the second screen D2 indicating the non-support as illustrated in the lower part of FIG. 9. Therefore, the second screen D2 indicating the non-support is displayed after the lapse of the second time T2 since the state was switched from the state that is not the second combination CO2 to the state of the second combination CO2. After that, the controller 11 ends the screen guidance process.

When the start of the screen guidance process was triggered by a change in the paper feeding mode M0 in the determination process of S106, the controller 11 starts, in S120, the timer for the second time T22 when switching the holding posture P0 without switching the display on the display unit 18 by using the clock circuit 15. As described above, the second time T22 is longer than the second time T21. After the timer starts, in S122, the controller 11 branches the process according to whether the main body 30 is held in any of the plurality of holding postures P0. When the main body 30 is not held in any of the plurality of holding postures P0, the controller 11 displays, on the display unit 18, an indefinite screen, for example, the third screen D3 illustrated in the upper part of FIG. 9, in S124, and returns the process to S122. Therefore, when the main body 30 is not held in any of the plurality of holding postures P0, the processes of S122 to S124 is repeated until the main body 30 is held in any of the plurality of holding postures P0.

When the main body 30 is held in any of the plurality of holding postures P0, the controller 11 advances the process to S126, and branches the process according to whether the combination of the holding posture P0 and the paper feeding mode M0 is out of support. When the combination is not out of support, that is, when the combination is the permitted first combination CO1, the controller 11 advances the process to S130 without waiting for the end of the timer, and displays, on the display unit 18, the support guidance screen D11 illustrated in the lower part of FIG. 9. Therefore, when the state of the second combination CO2 is switched to the state of the first combination CO1 before the elapse of the second time T2, the first screen D1 indicating the support is displayed. After that, the controller 11 ends the screen guidance process.

When the combination is out of support, that is, the prohibited second combination CO2, in the determination process of S126 the controller 11 advances the process to S128, and branches the process according to whether the timer has expired. When the timer has not expired, the controller 11 returns the process to S122. Accordingly, when the combination is switched to the allowable first combination CO1, the first screen D1 indicating the support is displayed in S130, and the screen guidance process ends. When the timer has expired, the controller 11 advances the process to S118, and displays, on the display unit 18, the second screen D2 indicating the non-support as illustrated in the lower part of FIGS. 6 and 9. Therefore, the second screen D2 indicating the non-support is displayed after the lapse of the second time T2 since the state was switched from the state that is not the second combination CO2 to the state of the second combination CO2. After that, the controller 11 ends the screen guidance process.

Figure 11:
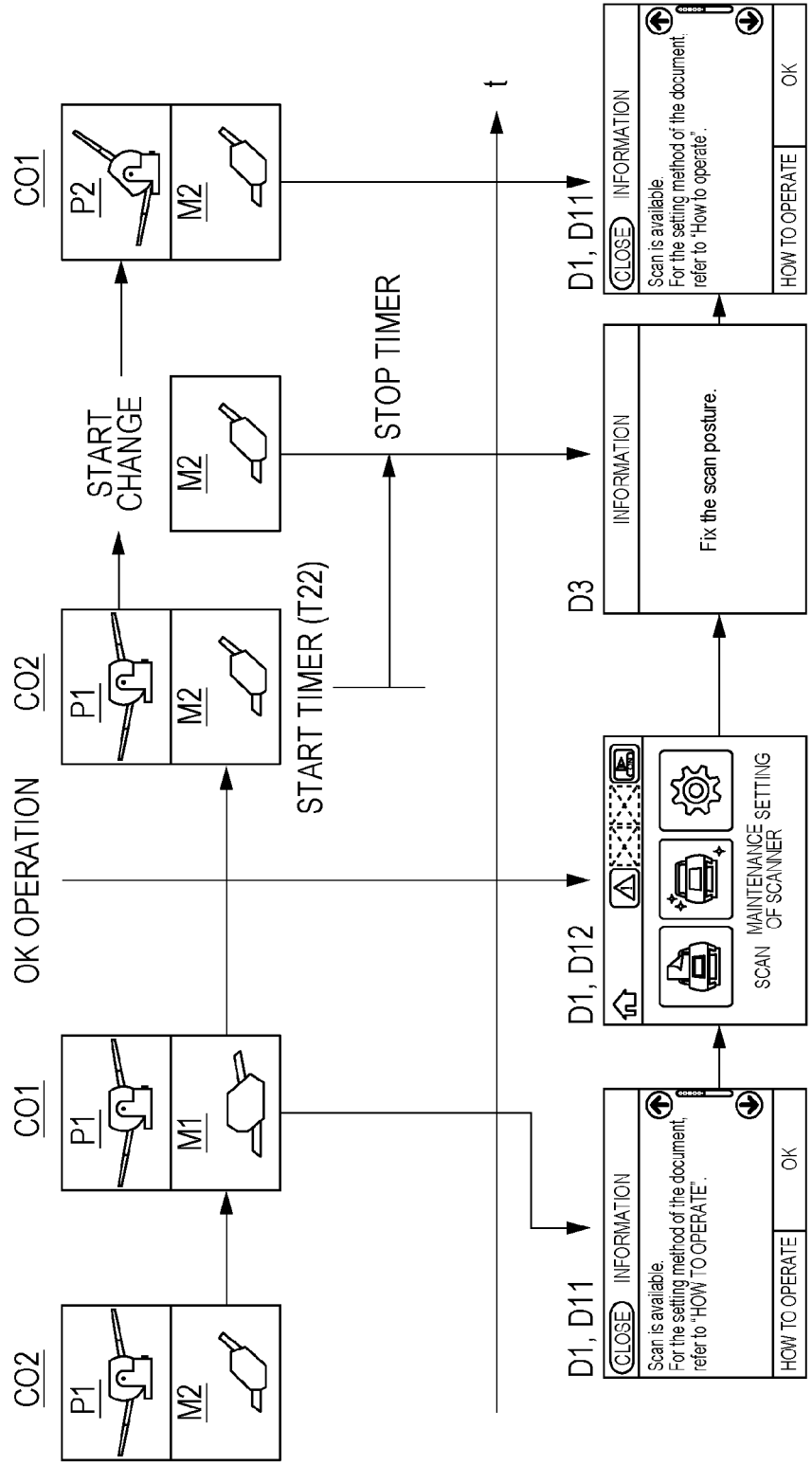
FIG. 11 is a diagram schematically illustrating a display example of a screen according to an operation.

FIGS. 11 to 14 schematically illustrate various screens displayed according to the above-described screen guidance process. FIG. 11 schematically illustrates an example in which the changeover to the standard posture P2 is performed before the lapse of the second time T22 after the changeover from the permitted first combination CO1 of the substantially horizontal posture P1 and the substantially horizontal paper feeding mode M1 to the standard paper feeding mode M2. First, when the state is switched from the state which is not the first combination CO1, for example, the state of the second combination CO2 to the state of the first combination CO1, the processes of S102 to S104 and S130 illustrated in FIG. 10 are performed, and the support guidance screen D11 is displayed. When the OK button on the support guidance screen D11 is operated, the home screen D12 is displayed. After that, when the mode is switched from the substantially horizontal paper feeding mode M1 to the standard paper feeding mode M2 by operating the mode changeover switch 61, the processes of S102 to S106 and S120 to S130 illustrated in FIG. 10 starts, the second screen D2 indicating the non-support is not displayed, and the timer for the second time T22 starts. When the main body 30 is released from the substantially horizontal posture P1 by the operation of the posture changeover lever 51, the third screen D3 indicating that the posture is indefinite is displayed in S124. At this time, as illustrated in FIG. 11, the controller 11 may stop the timer. When the main body 30 is held in the standard posture P2, the support guidance screen D11 is displayed in S130.

Figure 12:
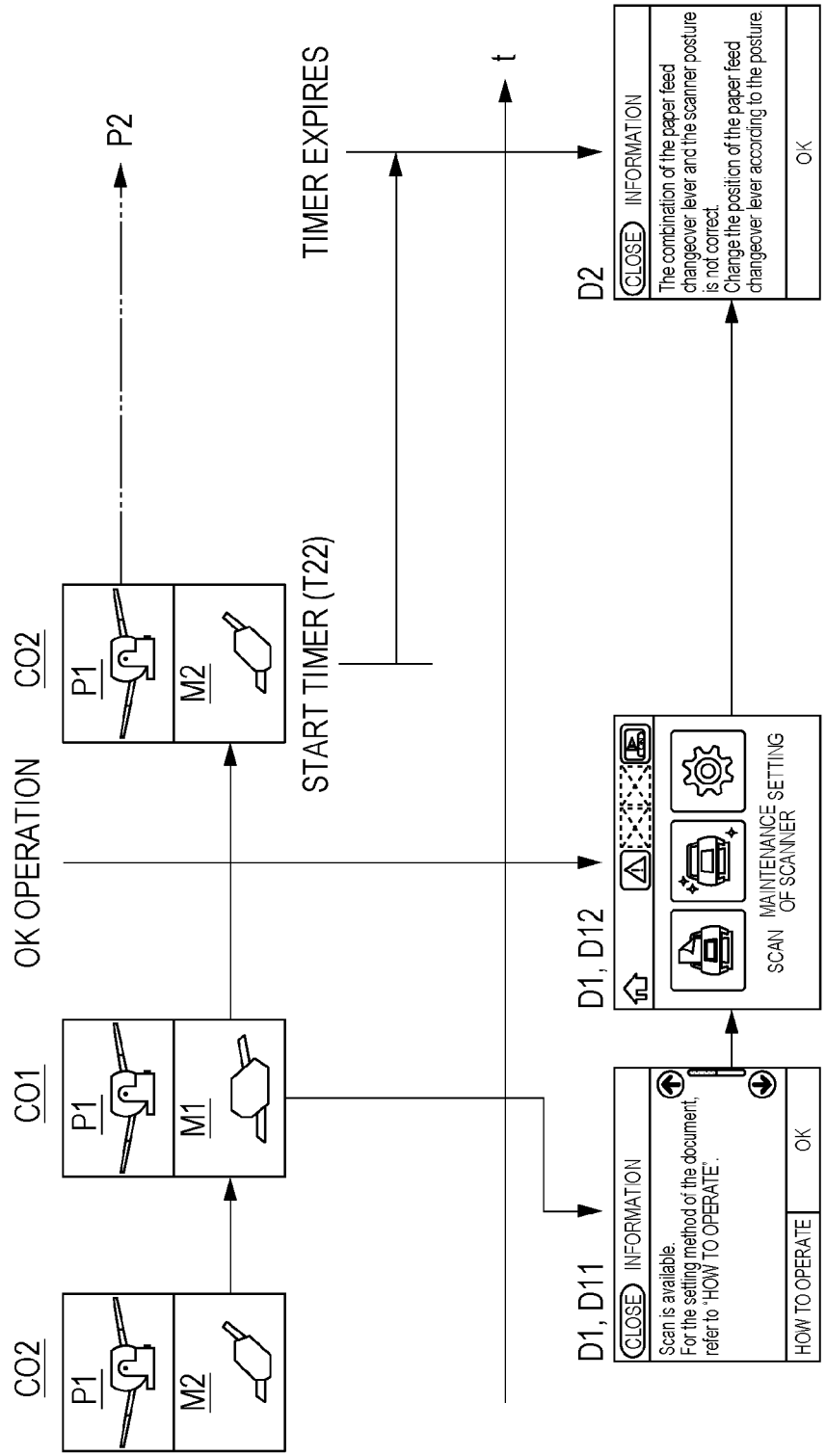
FIG. 12 is a diagram schematically illustrating a display example of a screen according to an operation.

FIG. 12 schematically illustrates an example in which the changeover to the standard posture P2 is not performed after the changeover from the permitted first combination CO1 of the substantially horizontal posture P1 and the substantially horizontal paper feeding mode M1 to the standard paper feeding mode M2. After the home screen D12 is displayed as in the case of FIG. 11, when the mode is switched from the substantially horizontal paper feeding mode M1 to the standard paper feeding mode M2 by operating the mode changeover switch 61, the processes of S102 to S106, S120 to S128, and S118 illustrated in FIG. 10 starts, and the timer for the second time T22 starts. When the substantially horizontal posture P1 of the main body 30 does not change, the second screen D2 indicating the non-support is displayed in S118.

Figure 13:
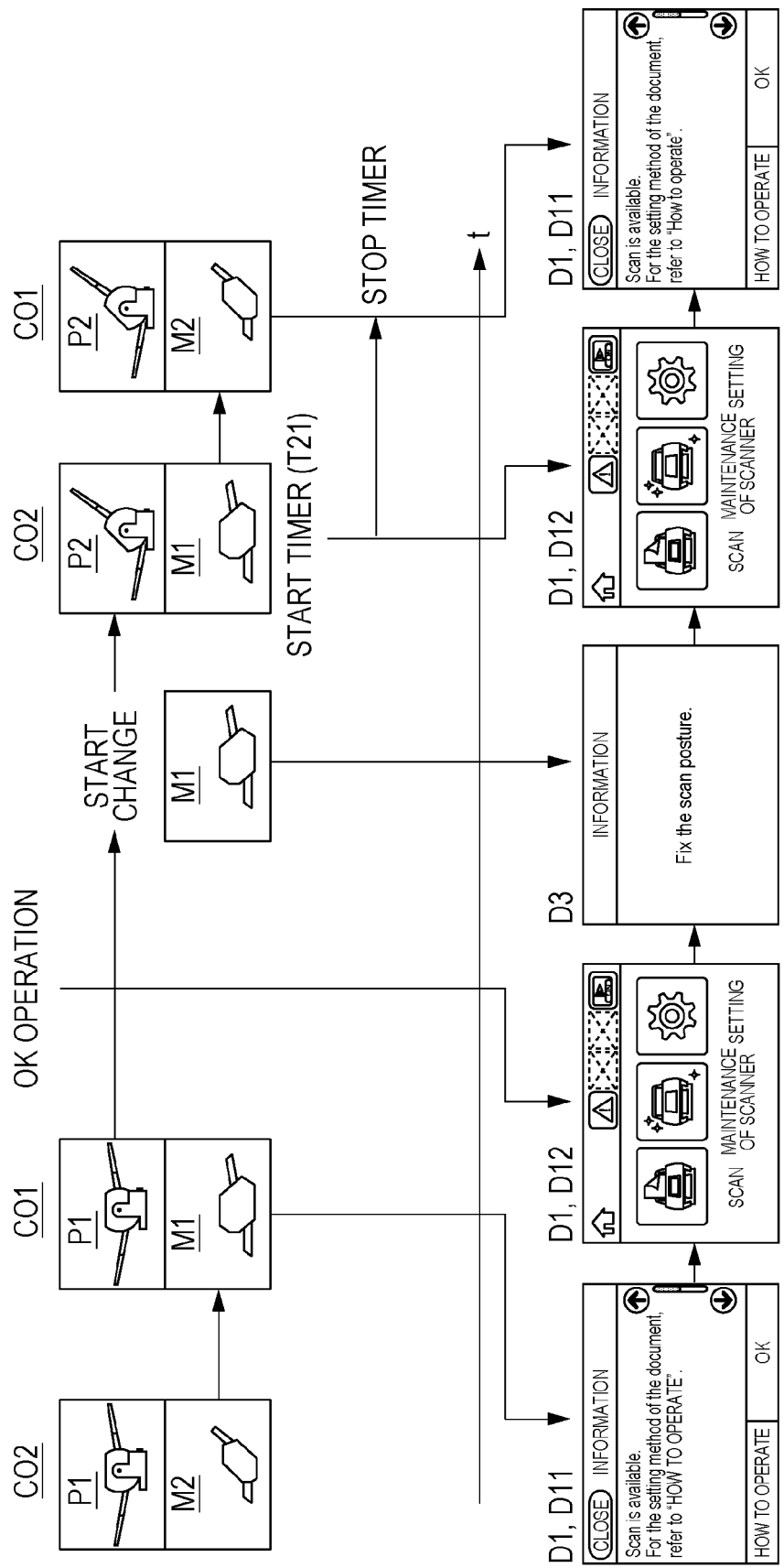
FIG. 13 is a diagram schematically illustrating a display example of a screen according to an operation.

FIG. 13 schematically illustrates an example in which the changeover to the standard paper feeding mode M2 is performed before the lapse of the second time T21 after the changeover from the permitted first combination CO1 of the substantially horizontal posture P1 and the substantially horizontal paper feeding mode M1 to the standard posture P2. After the home screen D12 is displayed in the first combination CO1 as in the case of FIG. 11, when the main body 30 is released from the substantially horizontal posture P1 by operating the posture changeover lever 51, the processes of S102 to S116 and S130 illustrated in FIG. 10 starts, and the third screen D3 indicating that the posture is indefinite is displayed in S110. When the main body 30 is held in the standard posture P2, the second screen D2 indicating the non-support is not displayed, the home screen D12 is displayed and the timer for the second time T21 starts in S112. When the mode is switched from the substantially horizontal paper feeding mode M1 to the standard paper feeding mode M2 by operating the mode changeover switch 61, the support guidance screen D11 is displayed in S130.

Figure 14:
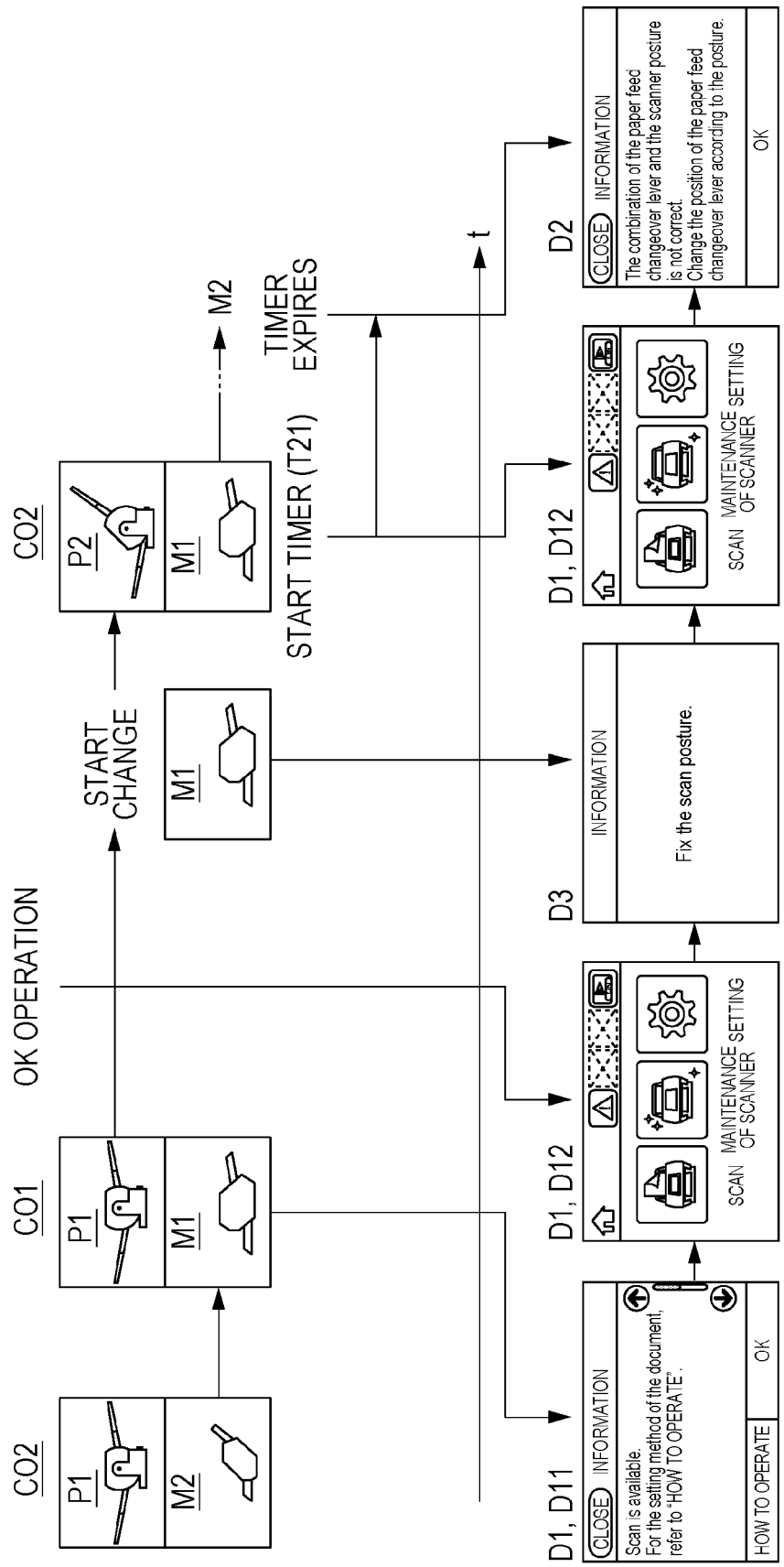
FIG. 14 is a diagram schematically illustrating a display example of a screen according to an operation.

FIG. 14 schematically illustrates an example in which the changeover to the standard paper feeding mode M2 is not performed after the changeover from the permitted first combination CO1 of the substantially horizontal posture P1 and the substantially horizontal paper feeding mode M1 to the standard posture P2. After the home screen D12 is displayed in the first combination CO1 as in the case of FIG. 11, when the main body 30 is released from the substantially horizontal posture P1 by operating the posture changeover lever 51, the processes of S102 to S118 illustrated in FIG. 10 starts, and the third screen D3 indicating that the posture is indefinite is displayed in S110. When the main body 30 is held in the standard posture P2, the home screen D12 is displayed and the timer for the second time T21 starts in S112. When the substantially horizontal paper feeding mode M1 does not change, the second screen D2 indicating the non-support is displayed in S118.

As described above, even when the combination of the holding posture P0 of the main body 30 and the paper feeding mode M0 is temporarily the unsupported combination second combination CO2, the display is not immediately switched to the second screen D2 indicating the non-support. When the temporary second combination CO2 is promptly switched to the first combination CO1, the first screen D1 indicating the support is displayed. In the state where the combination of the holding posture P0 and the paper feeding mode M0 does not match, the second screen D2 indicating the non-support is not inadvertently displayed, but is displayed to the user at more appropriate timing. Therefore, the user who views the screen D0 of the image reading apparatus 10 can use the image reading apparatus without feeling troublesome.

(4) Modification:

Various modifications of the present disclosure are conceivable. For example, the plurality of holding postures of the main body may include a holding posture other than the holding postures P1 to P3 described above. Further, the plurality of holding postures of the main body may not include the storage posture P3. Of course, the fact that the plurality of holding postures of the main body includes the substantially horizontal posture P1 is merely an example. For example, the present technology can be applied to a case where a plurality of holding postures of the main body does not include the substantially horizontal posture but includes a plurality of inclination postures having different inclinations. The plurality of paper feeding modes may include paper a paper feeding mode other than the above-described paper feeding modes M1 to M3. Further, the plurality of paper feeding modes may not include the manual paper feeding mode M3.

While the third screen D3 indicating that the posture is indefinite is displayed in the embodiment described above, the case where the third screen D3 is not displayed is also included in the present technology. While the second time T22 when the holding posture P0 is switched is set to be longer than the second time T21 when the paper feeding mode M0 is switched in the above-described embodiment, the present technology can be implemented even when T22 equals T21.

As long as the state is the prohibited second combination CO2 even when the second screen D2 indicating the non-support for the combination is not displayed, it is not possible to read the document OR1 even when the instruction to read the document OR1 is made. Therefore, in such a case, it is preferable that the second screen D2 be displayed triggered by an instruction to read the document OR1. FIG. 15 illustrates a screen guidance process for implementing the above-described display. This process is different from the screen guidance process illustrated in FIG. 10 in that the processes of S142 and S144 surrounded by the thick line are added. In the example illustrated in FIG. 15, the operation reception unit 19 that accepts an instruction to read the document OR1 functions as part of the controller 11.

The combination of the posture of the main body 30 and the paper feeding mode M0 is out of support, the timer for the second time T21 starts in S112, and when the combination is out of support in S114, the determination process of S142 is performed. In S142, the controller 11 branches the process according to whether the operation reception unit 19 has accepted an instruction to scan the document OR1, that is, an instruction to read the document OR1. When the scan instruction is accepted, the controller 11 displays, on the display unit 18, the second screen D2 indicating the non-support in S118 without waiting for the end of the timer. In a case where there is no scan instruction, when the timer expires, the second screen D2 is displayed, and when the combination is switched to the permitted first combination CO1 before the timer expires, the first screen D1 is displayed in S130.

The combination of the posture of the main body 30 and the paper feeding mode M0 is out of support, the timer for the second time T22 starts in S120, and when the combination is out of support in S126, the determination process of S144 is performed. In step S144, the controller 11 branches the process according to whether the operation reception unit 19 has accepted an instruction to scan the document OR1. When the scan instruction is accepted, the controller 11 displays, on the display unit 18, the second screen D2 indicating the non-support in S118 without waiting for the end of the timer. In a case where there is no scan instruction, when the timer expires, the second screen D2 is displayed, and when the combination is switched to the permitted first combination CO1 before the timer expires, the first screen D1 is displayed in S130.

As a result, even before the second time T2 elapses after the combination of the posture of the main body 30 and the paper feeding mode M0 is an unsupported combination, the second screen D2 is displayed indicating the non-support for the instruction to read the document OR1. Therefore, in the example illustrated in FIG. 15, it is possible to more appropriately grasp the state of the image reading apparatus.

Figure 17:
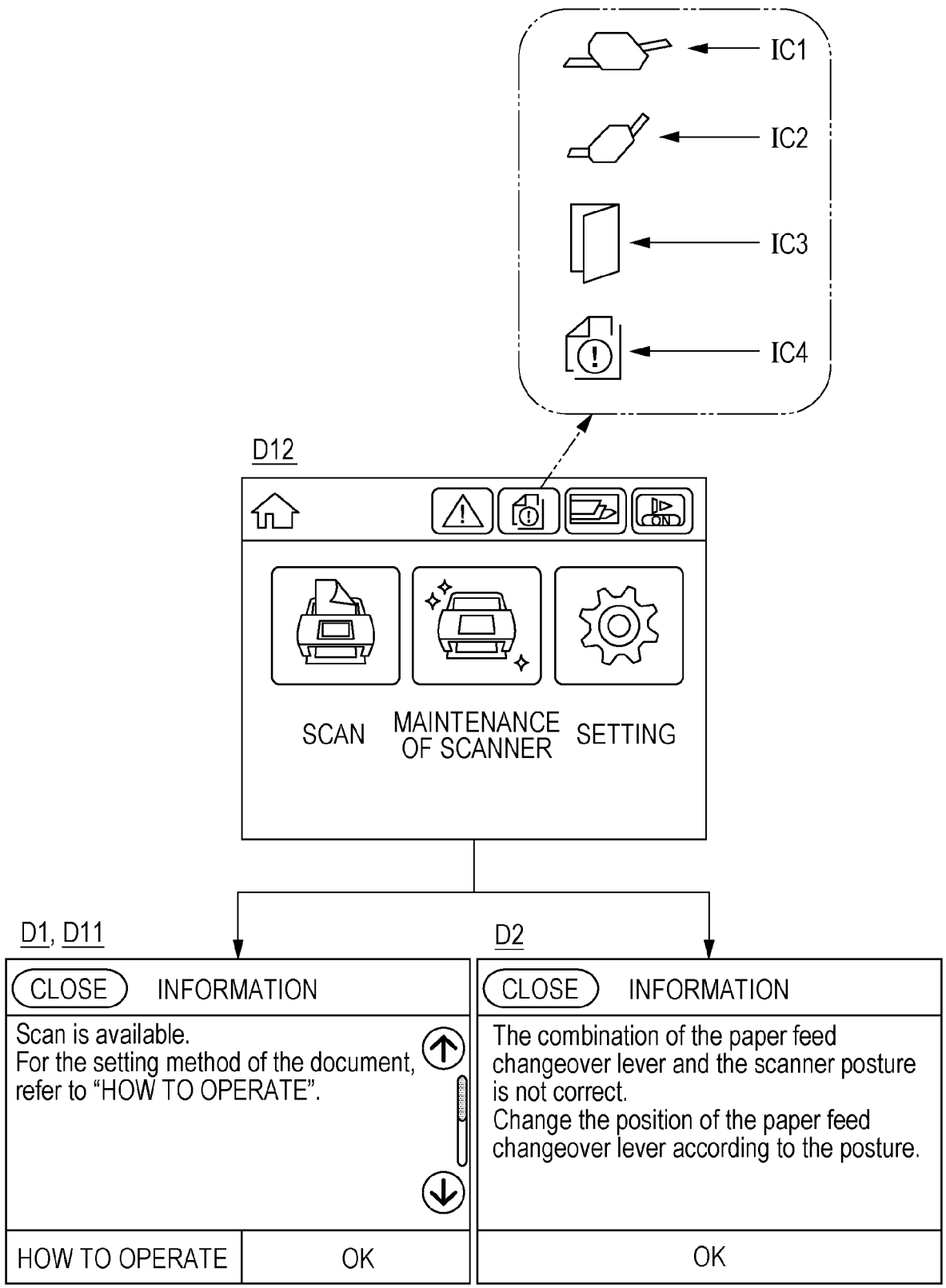
FIG. 17 is a diagram schematically illustrating a change example of a screen.

Information indicating the support or the non-support of the combination may be indicated by an icon display. FIG. 16 illustrates a screen guidance process for implementing the above-described display. This process is started when the fact that the posture of the main body 30 has been switched or the paper feeding mode M0 has been switched is detected. FIG. 17 schematically illustrates a screen change in the screen guidance process illustrated in FIG. 16. The upper part of FIG. 17 illustrates an enlarged view of the icons IC1 to IC4. Here, the substantially horizontal paper feeding icon IC1 is an icon indicating the support in the substantially horizontal paper feeding mode M1, the standard paper feeding icon IC2 is an icon indicating the support in the standard paper feeding mode M2, the manual paper feeding icon IC3 is an icon indicating the support in the manual paper feeding mode M3, and the non-support icon IC4 is an icon indicating the non-support. The display unit 18 is assumed to display the home screen D12 illustrated in FIG. 17. In the examples illustrated in FIGS. 16 and 17, the operation reception unit 19 that accepts taps on the icons IC1 to IC4 and an instruction to read the document OR1 functions as part of the controller 11.

When the screen guidance process starts, the controller 11 acquires the posture of the main body 30 from the posture detection unit 55 and acquires the state of the paper feeding mode M0 from the mode changeover switch 61 in S202. Next, in S204, the controller 11 branches the process according to whether the main body 30 is held in any of the plurality of holding postures P0. When the main body 30 is not held in any of the plurality of holding postures P0, the controller 11 displays, on the display unit 18, an indefinite screen, for example, the third screen D3 illustrated in the upper part of FIG. 9, in S206, and returns the process to S204. When the main body 30 is held in any of the plurality of holding postures P0, the controller 11 advances the process to S208, and branches the process according to whether the combination of the holding posture P0 and the paper feeding mode M0 is out of support.

When the combination is out of support, the controller 11 displays, on the display unit 18, the non-support icon IC4 as illustrated in FIG. 17 in S210. Next, in S212, the controller 11 branches the process according to whether the operation reception unit 19 has accepted a tap on the non-support icon IC4. When the tap on the non-support icon IC4 is accepted, the controller 11 displays, on the display unit 18, the second screen D2 indicating the non-support in S216, and ends the screen guidance process. When there is no tap on the non-support icon IC4, in S214, the controller 11 branches, the process according to whether the operation reception unit 19 has accepted an instruction to scan the document OR1. When the scan instruction is accepted, in S216, the controller 11 displays, on the display unit 18, the second screen D2 indicating the non-support as illustrated in the lower part of FIG. 17, and ends the screen guidance process. When there is no scan instruction, the controller 11 returns the process to S202.

When the combination is not out of support in the determination process of S208, in S218, the controller 11 displays, on the display unit 18, an icon corresponding to the current paper feeding mode M0 among the icons IC1 to IC3 indicating the support. Next, in S220, the controller 11 branches the process according to whether the operation reception unit 19 has accepted a tap on the icon. When the tap on the icon is accepted, in S222, the controller 11 displays, on the display unit 18, the support guidance screen D11 which is the first screen D1 indicating support as illustrated in the lower part of FIG. 17, and ends the screen guidance process. When there is no tap on the icon, the controller 11 returns the process to S202.

As a result, even when the state is temporarily switched from the state that is not the prohibited second combination CO2 to the second combination CO2, the screen is not switched to the second screen D2 indicating the non-support until the instruction to read the document OR1 is made. When there is an instruction to read the document OR1 in S214, which is the state of the second combination CO2, the second screen D2 is displayed. In the examples illustrated in FIGS. 16 and 17, it is possible to perform operations other than scanning, such as setting and maintenance operations in the prohibited second combination CO2 with the holding posture P0 and the paper feeding mode M0, so that the convenience is improved by displaying the second screen D2 triggered by the scan instruction. Also, when the icon indicating support is tapped even in a case where the first screen D1 indicating the support is not displayed, the first screen D1 is displayed, and when the non-support icon IC4 indicating the non-support is tapped even in a case where the second screen D2 indicating the non-support is not displayed, the second screen D2 is displayed. Therefore, the user who views the screen D0 of the image reading apparatus 10 can use the image reading apparatus without feeling troublesome.

(5) Closing:

As described above, according to the present disclosure, it is possible to provide a technique such as an image reading apparatus that does not make the user feel troublesome according to various embodiments. Of course, the above-described basic functions and effects can be obtained even with the technology including only the constituent components according to the independent claims. In addition, a configuration in which the configurations disclosed in the above-described examples are replaced with each other or the combination is switched, a configuration in which the configurations disclosed in the related art and the above-described examples are replaced with each other or the combination is switched, and other configurations can be implemented. The present disclosure includes these configurations and the like.

What is claimed is:

1. An image reading apparatus comprising:
   a main body including a reading unit reading a document and a document supply unit supplying the document to the reading unit;
   a support unit supporting the main body;
   a posture switching unit configured to switch between a plurality of holding postures of the main body having different inclinations;
   a mode switching unit configured to switch between a plurality of modes corresponding to respective types of the document;
   display unit configured to display a first screen indicating support for a first combination of the holding posture and the mode, the first combination being permitted, and a second screen indicating non-support for a second combination of the holding posture and the mode, the second combination being prohibited; and
   a controller controlling a display through the display unit, wherein
   the controller
      displays the first screen on the display unit when a state is switched from a state that is not the first combination to a state of the first combination, and
      sets, as a second time, a time longer than a first time until when the first screen is displayed from a time of a changeover to the state of the first combination, and displays the second screen on the display unit after the second time elapses since a state was switched from a state that is not the second combination to a state of the second combination.

2. The image reading apparatus according to claim 1, wherein
   the controller displays the first screen on the display unit when a state is switched from a state of the second combination to a state of the first combination before the second time elapses.

3. The image reading apparatus according to claim 1, wherein
   the controller displays the second screen on the display unit when accepting an instruction to read the document before the second time elapses in a state of the second combination.

4. The image reading apparatus according to claim 1, wherein
   the second time when a state is switched to the first combination state by a changeover of the holding posture after switched to the second combination state is longer than the second time when a state is switched to the first combination state by a changeover of the mode after switched to the second combination state.

5. The image reading apparatus according to claim 1, wherein
   the controller displays, on the display unit, a third screen indicating that the main body is not held in any of the plurality of holding postures when the main body is not held in any of the plurality of holding postures.

6. The image reading apparatus according to claim 1, further comprising:

a posture detection unit detecting a posture of the main body, wherein the controller displays the first screen on the display unit when a combination of the posture detected by the posture detection unit and the mode indicated by the mode switching unit is switched from a state that is not the first combination to a state of the first combination, and displays the second screen on the display unit after the second time elapses since a combination of the posture detected by the posture detection unit and the mode indicated by the mode switching unit was switched from a state that is not the second combination to a state of the second combination.

7. An image reading apparatus comprising:

a main body including a reading unit reading a document and a document supply unit supplying the document to the reading unit;

a support unit supporting the main body;

a posture switching unit configured to switch between a plurality of holding postures of the main body having different inclinations;

a mode switching unit configured to switch between a plurality of modes corresponding to respective types of the document;

a display unit configured to display a first screen indicating support for a first combination of the holding posture and the mode, the first combination being permitted, and a second screen indicating non-support for a second combination of the holding posture and the mode, the second combination being prohibited; and a controller controlling a display through the display unit, wherein the controller does not display the second screen on the display unit even when a state is switched from a state that is not the second combination to a state of the second combination, and displays the second screen on the display unit when accepting an instruction to read the document in a state of the second combination.

8. A method of controlling an image reading apparatus, the image reading apparatus including a main body including a reading unit reading a document and a document supply unit supplying the document to the reading unit, a support unit supporting the main body, a posture switching unit configured to switch between a plurality of holding postures of the main body having different inclinations, a mode switching unit configured to switch between a plurality of modes corresponding to respective types of the document, and a display unit displaying a screen, wherein the display unit is configured to display a first screen indicating support for a first combination of the holding posture and the mode, the first combination being permitted, and a second screen indicating non-support for a second combination of the holding posture and the mode, the second combination being prohibited, the controlling method comprising:

a first step of displaying the first screen on the display unit when a state is switched from a state that is not the first combination to a state of the first combination; and a second step of setting, as a second time, a time longer than a first time until when the first screen is displayed from a time of a changeover to the state of the first combination, and displaying the second screen on the display unit after the second time elapses since a state was switched from a state that is not the second combination to a state of the second combination.

* * * * *